United States Patent
Kubota

(10) Patent No.: US 9,862,344 B2
(45) Date of Patent: Jan. 9, 2018

(54) LOAD OBJECT DETERMINATION APPARATUS

(71) Applicant: Toyota Jidosha Kabushiki Kaisha, Toyota-shi Aichi-ken (JP)

(72) Inventor: Yosuke Kubota, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 361 days.

(21) Appl. No.: 14/859,846

(22) Filed: Sep. 21, 2015

(65) Prior Publication Data

US 2016/0096498 A1    Apr. 7, 2016

(30) Foreign Application Priority Data

Oct. 7, 2014    (JP) .................. 2014-206706

(51) Int. Cl.
| B60R 21/015 | (2006.01) |
| B60N 2/00 | (2006.01) |
| G01C 9/00 | (2006.01) |
| G01L 25/00 | (2006.01) |
| B60N 2/26 | (2006.01) |
| B60N 2/02 | (2006.01) |

(52) U.S. Cl.
CPC .......... B60R 21/0152 (2014.10); B60N 2/002 (2013.01); B60N 2/26 (2013.01); B60R 21/01516 (2014.10); B60R 21/01546 (2014.10); B60R 21/01556 (2014.10); G01C 9/00 (2013.01); G01L 25/00 (2013.01); *B60N 2002/0272* (2013.01)

(58) Field of Classification Search
CPC ............................................... B60R 21/01516
See application file for complete search history.

(56) References Cited

U.S. PATENT DOCUMENTS

| 2010/0138078 A1 | 6/2010 | Choi et al. |
| 2012/0312604 A1 | 12/2012 | Fujii |
| 2013/0218487 A1 | 8/2013 | Fujii et al. |

FOREIGN PATENT DOCUMENTS

| JP | 2007-055556 A | 3/2007 |
| JP | 2013-001152 A | 1/2013 |
| JP | 2013-169947 A | 9/2013 |

*Primary Examiner* — Hezron E Williams
*Assistant Examiner* — Alex Devito
(74) *Attorney, Agent, or Firm* — Dinsmore & Shohl LLP

(57) ABSTRACT

A load exerted on one of supporting parts supporting a seat of a vehicle is detected and is corrected according to an inclination of the vehicle. A load object on the seat is determined a plurality of times of turning on and turning off an ignition of the vehicle using the load thus corrected or the load detected. The load object is determined as an adult at least when the load is greater than or equal to a first threshold and determined as other than an adult at least when the load is less than a second threshold that is less than the first threshold. A function is further provided of determining the load object from a combination of a magnitude relation between the load and a third threshold less than or equal to the first threshold and greater than the second threshold and the inclination of the vehicle.

18 Claims, 15 Drawing Sheets

| | CONDITION No. 1 | CONDITION No. 2 | CONDITION No. 3 | CONDITION No. 4-1 | CONDITION No. 4-2 | CONDITION No. 5 | CONDITION No. 6 |
|---|---|---|---|---|---|---|---|
| BEFORE TRANSITION | NO OCCUPANT/ CHILD | NO OCCUPANT/ CHILD | ADULT | ADULT | ADULT | CRS | CRS |
| AFTER TRANSITION | ADULT | CRS | NO OCCUPANT/ CHILD | CRS | CRS | NO OCCUPANT/ CHILD | ADULT |
| ACCELERATION | - | - | - | - | $\geq$ath (LEFTWARD) | - | - |
| BUCKLE STATE | ON | ON | OFF | ON | ON | OFF | ON |
| LOAD CONDITION | $\geq$W1 | <W1 | <W2 | <W2 | <W3 | - | $\geq$W1 |
| DETERMINATION PERIOD OF TIME | 1s | 5s | 5s | 5s | 3s | - | 5s |

WHERE W1$\geq$W3>W2

FIG.6

| | CONDITION No. 1 | CONDITION No. 2-1 | CONDITION No. 2-2 |
|---|---|---|---|
| BEFORE TRANSITION | NO OCCUPANT/CHILD/CRS | ADULT | ADULT |
| AFTER TRANSITION | ADULT | NO OCCUPANT/CHILD/CRS | NO OCCUPANT/CHILD/CRS |
| ACCELERATION | — | — | $\geq a_{th}$ (LEFTWARD) |
| LOAD CONDITION | $\geq W1$ | $<W2$ | $<W3$ |
| DETERMINATION PERIOD OF TIME | 1s | 5s | 3s |

WHERE $W1 \geq W3 > W2$

FIG.9

|  | CONDITION No. 1 | CONDITION No. 2 | CONDITION No. 3 | CONDITION No. 4-1 | CONDITION No. 4-2 | CONDITION No. 5 | CONDITION No. 6 |
|---|---|---|---|---|---|---|---|
| BEFORE TRANSITION | NO OCCUPANT/ CHILD | NO OCCUPANT/ CHILD | ADULT | ADULT | ADULT | CRS | CRS |
| AFTER TRANSITION | ADULT | CRS | NO OCCUPANT/ CHILD | CRS | CRS | NO OCCUPANT/ CHILD | ADULT |
| ACCELERATION | – | – | – | – | $\geq a_{th}$ (LEFTWARD) | – | – |
| BUCKLE STATE | ON | ON | OFF | ON | ON | OFF | ON |
| LOAD CONDITION | $\geq W1$ | $<W1$ | $<W2$ | $<W2$ | $<W3$ | – | $\geq W1$ |
| DETERMINATION PERIOD OF TIME | 1s | 5s | 5s | 5s | 3s | – | 5s |

WHERE $W1 \geq W3 > W2$

FIG.11

|  | CONDITION No. 1 | CONDITION No. 2-1 | CONDITION No. 2-2 |
|---|---|---|---|
| BEFORE TRANSITION | NO OCCUPANT/ CHILD/CRS | ADULT | ADULT |
| AFTER TRANSITION | ADULT | NO OCCUPANT/ CHILD/CRS | NO OCCUPANT/ CHILD/CRS |
| LOAD CONDITION | ≧W1 | <W2 | <W3 |
| DURATION | 1s | 5s | 3s |
| VALID PERIOD OF TIME | - | - | 10s FROM IG-ON |

WHERE W1≧W3>W2

FIG.12

| | CONDITION No. 1 | CONDITION No. 2-1 | CONDITION No. 2-2 |
|---|---|---|---|
| BEFORE TRANSITION | NO OCCUPANT/ CHILD/CRS | ADULT | ADULT |
| AFTER TRANSITION | ADULT | NO OCCUPANT/ CHILD/CRS | NO OCCUPANT/ CHILD/CRS |
| LOAD CONDITION | ≧W1 | <W2 | <W3 |
| DURATION | 1s | 5s | 3s |
| VALID PERIOD OF TIME | — | — | AT A TIME OF INITIAL TRAVELLING AFTER IG-ON (FROM TRAVELLING START TO STOP) |

WHERE W1≧W3>W2

FIG.14

|  | CONDITION No. 1-1 | CONDITION No. 1-2 | CONDITION No. 2 |
|---|---|---|---|
| BEFORE TRANSITION | NO OCCUPANT/CHILD/CRS | NO OCCUPANT/CHILD/CRS | ADULT |
| AFTER TRANSITION | ADULT | ADULT | NO OCCUPANT/CHILD/CRS |
| ACCELERATION | — | ≧ath(RIGHTWARD) | — |
| LOAD CONDITION | ≧W4 | ≧W5 | <W1 |
| DETERMINATION PERIOD OF TIME | 1s | 3s | 5s |

WHERE W4>W5≧W1

LOAD OBJECT DETERMINATION APPARATUS

BACKGROUND OF THE INVENTION

1. Field of the Invention

The present invention relates to a load object determination apparatus.

2. Description of the Related Art

In the related art, a load object determination apparatus is known, where, for example, load sensors are installed at two supporting parts at one of left and right sides or one of front and rear sides from among four supporting parts below a seat of a vehicle, and a type of a load object on the seat is determined based on part of the load exerted on all the supporting parts (for example, see Japanese Laid-Open Patent Application No. 2013-169947 (Patent Reference No. 1)).

Thus, it is possible to provide a load object determination apparatus at low cost because it is possible to determine the type of an occupant by installing load sensors on minimum two supporting parts from among seat supporting parts, the number of which is normally four.

Also, in the related art, a load object determination apparatus is known, where, in order to determine the type of a load object on a seat, determination thresholds are prepared such as an adult determination threshold, a child seat determination threshold, and/or the like, and it is determined whether the load object is an adult or a child seat by using the determination threshold(s) (for example, see Patent Reference No. 1).

According to Patent Reference No. 1, it is determined that an adult is seated, when the total of loads (total load) detected by load sensors installed at two of front and rear places at the left of a seat is greater than the adult determination threshold, and it is determined that a child seat is lashed when the total load is less than the child seat determination threshold.

SUMMARY OF THE INVENTION

According to an aspect of the present invention, a load object determination apparatus includes a load detection part installed at a supporting part at either one of two opposite sides from among a plurality of the supporting parts that support a seat of a vehicle, the load detection part detecting a load exerted on the supporting part; a load correction part that corrects the load detected by the load detection part according to each of inclinations of the vehicle in the two opposite sides; an inclination detection part that detects a physical quantity corresponding to each of the inclinations of the vehicle in the two opposite sides; a determination part that at least determines whether the load object on the seat is an adult or other than an adult including a lashed child seat a plurality of times of a predetermined timing during a period of time from turning on an ignition of the vehicle to turning off the ignition using a corrected load as a load for determination when the load corrected by the load correction part is available and using a load detected by the load detection part as the load for determination when the load corrected by the load correction part is not available, and determines that the load object on the seat is an adult at least when the load for determination is greater than or equal to a first threshold and determines that the load object on the seat is other than an adult at least when the load for determination is less than a second threshold that is set to be less than the first threshold. The determination part further has a function of determining whether the load object on the seat is an adult or other than an adult according to a combination of a magnitude relation between the load for determination and a third threshold that is set to be less than or equal to the first threshold and greater than the second threshold and the physical quantity detected by the inclination detection part.

Other objects, features and advantages of the present invention will become more apparent from the following detailed description when read in conjunction with the accompanying drawings.

BRIEF DESCRIPTION OF THE DRAWINGS

FIG. 6 illustrates determination conditions in the load object determination apparatus according to the first embodiment;

FIG. 9 illustrates determination conditions for the load object determination apparatus according to the variant of the first embodiment;

FIG. 11 illustrates determination conditions in the load object determination apparatus according to a second embodiment;

FIG. 12 illustrates determination conditions in the load object determination apparatus according to a third embodiment;

FIG. 14 illustrates determination conditions in the load object determination apparatus according to the fourth embodiment.

DETAILED DESCRIPTION OF THE EMBODIMENTS

Figure 1:
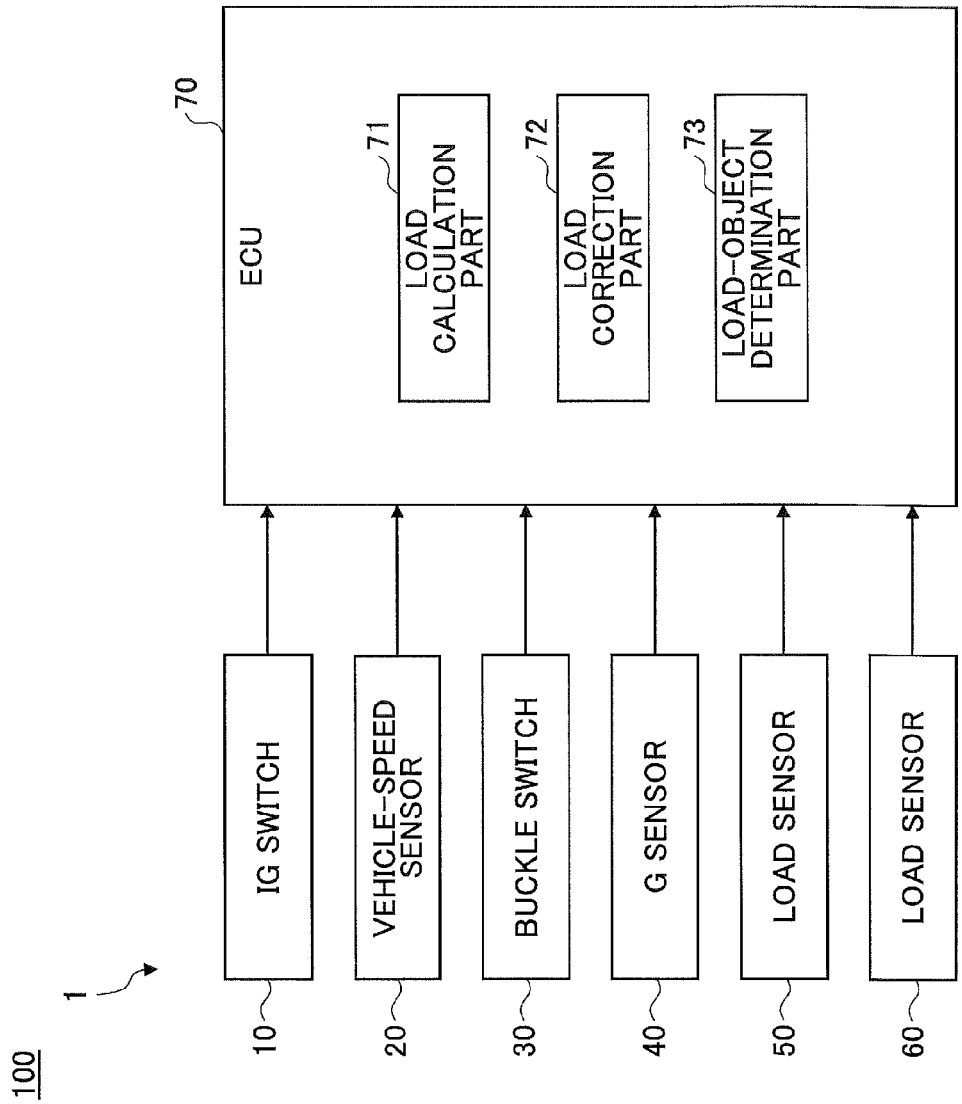
FIG. 1 is a block diagram illustrating one example of a configuration of a load object determination apparatus.

The embodiments of the present invention relate to load object determination apparatuses determining a type (i.e., an adult, a child seat, no occupant and/or the like) of a load object on a seat of a vehicle.

When a type of a load object on a seat is determined based on a part of the load exerted on all the supporting parts of the seat, an erroneous determination may occur easily due to a change in the seated posture or so if an adult determination threshold for determining whether the load object is an adult is set to be the same value as a child seat determination threshold for determining whether the load object is a child seat or so. For example, when a load sensor is installed at either one of left and right sides of the seat, even after an adult is seated on the seat and it is first determined that an adult is seated, it may be determined thereafter that the load object is a child seat or so depending on a change in the seated posture whereby the load detected by the load sensor becomes less than the adult determination threshold (or the child seat determination threshold). Therefore, in order to avoid such an erroneous determination, it is preferable to provide a predetermined difference (i.e., a hysteresis width) between the adult determination threshold and the child seat determination threshold.

However, when a difference is provided between the adult determination threshold and the child seat determination threshold, a problem may occur when a vehicle is stopped on a slope or so. For example, when an ignition is turned on in a state where a vehicle is parked on a slope, the load detected by a load sensor may be greater than that of a flat place. Thereby, even when a child seat is lashed onto a seat, the load detected by a load sensor may be greater than the adult determination threshold and it may be erroneously determined that an adult is seated on the seat. If a difference is provided between the adult determination threshold and the child seat determination threshold, it may be continuously erroneously determined that an adult is seated on the seat even after the vehicle returns to a flat place when the load detected by a load sensor does not become less than the child seat determination threshold whereas it becomes less than the adult determination threshold.

It is also possible that a load detected by a load sensor is corrected according to the degree of an inclination (inclination degree) of a vehicle, and the type of the load object on the seat is determined based on the corrected load. However, it may be impossible that a sensor detecting an inclination degree of a vehicle is capable of making a precise detection when a certain period has elapsed after turning on an ignition. Also, a delay may be present after turning on an ignition before a load correcting process is started. Therefore, immediately after turning on an ignition, it may be impossible to correct a load detected by a load sensor according to a vehicle's inclination degree, and determine the type of a load object on a seat based on the corrected load. Thus, a problem may occur when a vehicle is stopped on a slope or so if a difference is provided between the adult determination threshold and the child seat determination threshold even in a load object determining apparatus that is capable of correcting a load detected by a load sensor according to a vehicle's inclination degree or so and determining the type of a load object on a seat based on the corrected load.

In consideration of the problem, an object of the embodiments and variants is to provide a load object determination apparatus that is capable of making a correct determination of a load object even after making an erroneous determination due to a vehicle being stopped on a slope or so, while avoiding an erroneous determination due to a change in the posture of an occupant seated on a seat, when detecting a load exerted on some supporting part(s) among a plurality of the supporting parts of a seat and determining the type of a load object on the seat based on the load.

Below, with reference to the drawings, the embodiments and variants of the present invention will be described.

First Embodiment

Using FIGS. 1 and 2, a configuration of a load object determination apparatus 1 will be described.

FIG. 1 is a block diagram illustrating one example of the configuration of the load object determination apparatus installed in a vehicle 100. FIG. 2 illustrates an arrangement of load sensors 50 and 60 included in the load object determination apparatus 1 and arrangement relationships of the load sensors 50 and 60 with respect to a seat 80.

Note that according to the first embodiment, the vehicle 100 is a so-called "left-hand drive" vehicle (i.e., a vehicle where a driving seat is installed at a left side). Also, the seat 80 in FIG. 2 is the front passenger seat of the vehicle 100. The respective arrows "front", "rear", "left", "right", "up" and "down" in FIG. 2 represent a forward direction, a rearward direction, a leftward direction, a rightward direction, an upward direction and a downward direction, respectively, of the vehicle 100, and the same way will also be applied hereinafter.

As shown in FIG. 1, the load object determination apparatus 1 includes an ignition switch (IG switch) 10, a vehicle speed sensor 20, a buckle switch 30, a G sensor 40, load sensors 50 and 60 and an electronic control unit (ECU) 70.

The ignition switch (IG switch) 10 is a device for starting the vehicle 100 (IG-ON), and also, a device for stopping the vehicle 100 (IG-OFF). Turning on and off the IG switch 10 is performed through a driver's corresponding operations. For example, when the vehicle 100 has an internal-combustion engine as its driving source, the engine is started when the IG switch 10 is turned on. When the vehicle 100 is an electric vehicle, an electronic control unit (ECU) controlling the entirety of the vehicle 100 is started when the IG switch 10 is turned on and then, the vehicle enters a state capable of traveling by using an electric motor. The IG switch 10 is connected with the ECU 70 in a manner of being able to communicate therebetween through an onboard LAN, directly by wire or so, and thus, an IG state signal (an ON signal or an OFF signal) is transmitted to the ECU 70 from the IG switch 10.

The vehicle speed sensor 20 is a known vehicle speed detection device that detects the vehicle speed of the vehicle 100. The vehicle speed sensor 20 is connected with the ECU 70 in a manner of being able to communicate therebetween through an onboard LAN, directly by wire or so, and thus, a signal (a vehicle speed signal) corresponding to the vehicle speed of the vehicle 100 is transmitted to the ECU 70 from the vehicle speed sensor 20.

Figure 2:
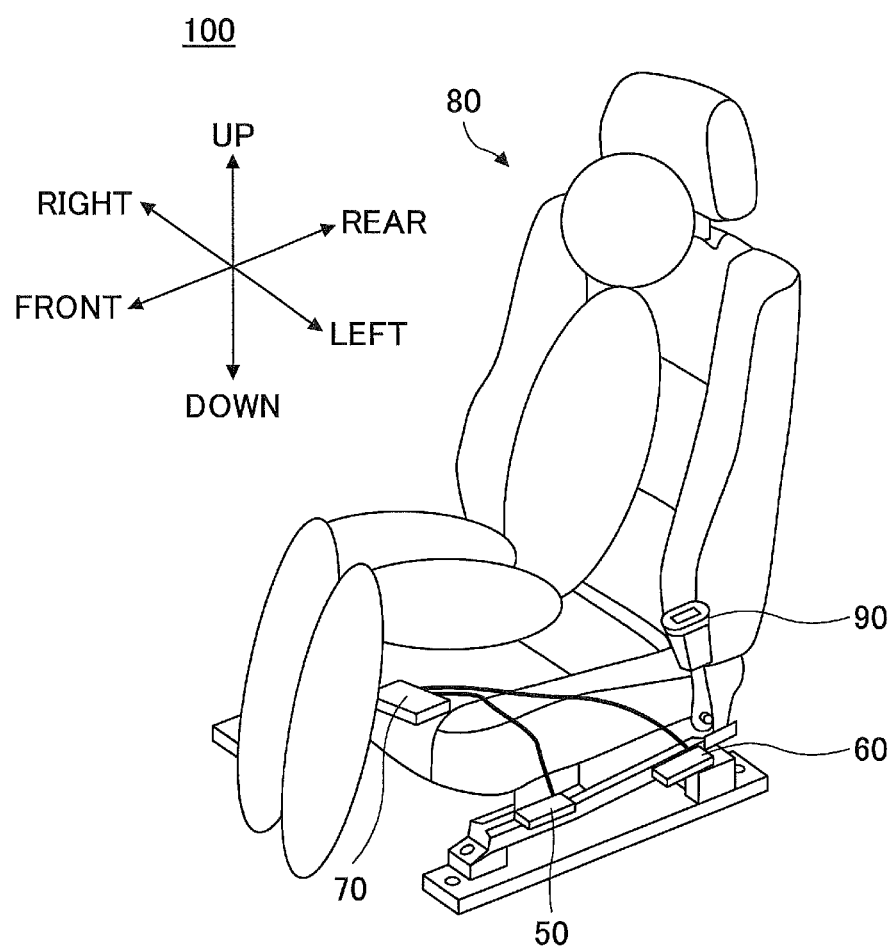
FIG. 2 illustrates an arrangement of load sensors.

The buckle switch 30 is a device detecting a wearing state of a seat belt, and is installed in a buckle 90 for an occupant to wear the seat belt for the seat 80 shown in FIG. 2. The buckle switch 30 is connected with the ECU 70 in a manner of being able to communicate therebetween through an onboard LAN, directly by wire or so, and thus, a signal (a buckle signal) corresponding a wearing state of the seat belt is transmitted to the ECU 70 from the buckle switch 30.

The G sensor 40 is a known acceleration detection device detecting the acceleration exerted on the vehicle 100. Specifically, the G sensor 40 is installed near the center of gravity of the vehicle 100 in a manner capable of detecting the acceleration Gx in the forward/rearward directions, the acceleration Gy in the leftward/rightward directions and the acceleration Gz in the upward/downward directions. The G sensor 40 is connected with the ECU 70 in a manner of being able to communicate therebetween through an onboard LAN, directly by wire or so, and thus, signals corresponding to the accelerations Gx, Gy and Gz are transmitted to the ECU 70 from the G sensor 40.

Hereinafter, the acceleration in the leftward/rightward directions may be referred to as a "lateral acceleration", and the acceleration Gy may be referred to as a "lateral acceleration Gy".

The load sensors 50 and 60 are load detection devices detecting loads exerted on corresponding supporting parts of the seat 80. For example, the load sensors 50 and 60 can be sensors of a strain gauge type. As shown in FIG. 2, the load sensor 50 is installed at the front-left supporting part of the seat 80 and the load sensor 60 is installed at the rear-left supporting part of the seat 80. The load sensors 50 and 60 detect the loads exerted on the respective supporting parts. The load sensors 50 and 60 are connected to the ECU 70 in a manner of being able to communicate therebetween through an onboard LAN, directly by wire or so, and thus, signals (i.e., load signals) corresponding to the detected loads are transmitted to the ECU 70 from the load sensors 50 and 60.

Note that, in addition to these left two supporting parts at which the load sensors 50 and 60 are installed, the seat 80 has front-right and rear-right supporting parts approximately at corresponding positions at the right side. Thus, the seat 80 has such a structure that the supporting parts separately installed at the four positions support the load of the seat 80 itself and the load of an occupant, and the load sensors 50 and 60 detect a part of the load exerted on all the supporting parts of the seat 80.

The ECU 70 is a main control device of the load object determination apparatus 1. It is possible that the ECU 70 includes, for example, a microcomputer, and implements various processes by executing various programs stored in a ROM by a CPU. It is also possible that the ECU 70 includes, as functional parts, a load calculation part 71, a load correction part 72, and a load object determination part 73, which are implemented as a result of the CPU executing corresponding programs, for example.

The load calculation part 71 calculates the load W exerted on the supporting parts at the left two places of the seat 80 from the load signals that are input from the load sensor 50 and the load sensor 60 through a predetermined conversion formulas. The load W corresponds to the total of the loads detected by the load sensor 50 and the load sensor 60.

The loads exerted on the respective supporting parts of the seat 80 include the weight of the seat 80 itself. Therefore, zero-point calibration is previously carried out for the load W such that the load W is zero in a reference condition where the vehicle 100 is not inclined and no load object is placed on the seat 80. For example, the zero-point calibration can be implemented as a result of parameters of the conversion formula being appropriately set, the levels of the load signals being adjusted, and/or the like. Hereinafter, the "load W detected by the load sensors 50 and 60" means the "load W calculated by the load calculation part 71 based on the load signals from the load sensors 50 and 60".

The load correction part 72 corrects the load W calculated by the load calculation part 71 and outputs a corrected load WC to be used for determining the load object by the load object determination part 73.

Using FIGS. 3 and 4, the correction of the load W by the load correction part 72 will now be described.

Figure 3:
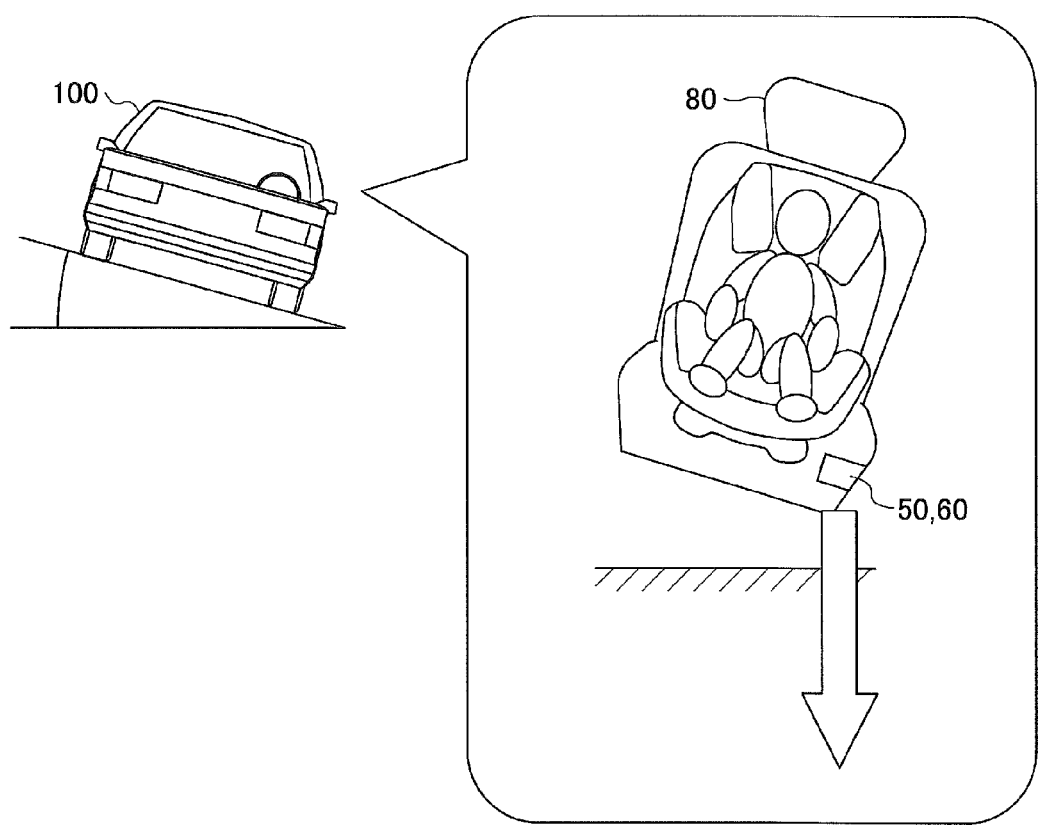
FIG. 3 illustrates a state where a vehicle is on a left-downward slope.

FIG. 3 illustrates a state where the vehicle 100 is on a left-downward slope. More specifically, FIG. 3 illustrates the vehicle 100 on the left-downward slope (at a left side of FIG. 3) and the load sensors 50 and 60 and the seat 80 extracted from the vehicle 100 in this state (at a right side of FIG. 3). FIG. 4 illustrates one example of a method of correcting the load W detected by the load sensors 50 and 60. Specifically, FIG. 4 illustrates relations of the loads W and the corrected loads WC when the vehicle 100 is present on a slope inclined in the leftward or rightward direction with a determination threshold for making a load object determination.

Except when the vehicle 100 is turning, the lateral acceleration Gy corresponds to an inclination degree of the vehicle 100 in the leftward or rightward direction. Therefore, the lateral acceleration Gy in FIG. 4 is used as an index indicating an inclination degree of the vehicle 100 in the leftward or rightward direction. The broken line $LW_{AD}$ in FIG. 4 represents a change in the load W with respect to the lateral acceleration Gy when an adult assumed to be a small woman is seated on the seat 80. The solid line $LWC_{AD}$ in FIG. 4 represents a change in the corrected load WC corrected from the load W with respect to the lateral acceleration Gy when an adult assumed to be a small woman is seated on the seat 80. The broken line $LW_{CRS}$ in FIG. 4 represents a change in the load W with respect to the lateral acceleration Gy when an infant is seated on a child seat (i.e., a Child Restraint System (CRS)) lashed to the seat 80. The solid line $LWC_{CRS}$ in FIG. 4 represents a change in the corrected load WC corrected from the load W with respect to the lateral acceleration Gy when an infant is seated on a child seat (i.e., a Child Restraint System (CRS)) lashed to the seat 80. The alternate long and short dash line LTh corresponds to the determination threshold for determining whether the load object on the seat 80 is an adult or a child seat (i.e., an infant). However, the determination threshold is set for the purpose of explaining a method of correcting the load W detected by the load sensors 50 and 60 and is different from one to be used for a load object determination by the load object determination part 73 described later.

As shown in FIG. 3, when the vehicle 100 is stopped on a left-downward slope or travels on a left-downward slope, the shared load exerted on the supporting parts at the left side of the seat 80 at which the load sensors 50 and 60 are installed increases accordingly. Contrary to FIG. 3, when the vehicle 100 is stopped on a right-downward slope or travels on a right-downward slope, the shared load exerted on the supporting parts at the left side of the seat 80 at which the load sensors 50 and 60 are installed decreases accordingly. Therefore, as can be seen from the broken lines $LW_{AD}$ and $LW_{CRS}$ of FIG. 4, the load W detected by the load sensors 50 and 60 increases approximately linearly as the left-downward slope becomes steeper, whereas it decreases approximately linearly as the right-downward slope becomes steeper.

Figure 4:
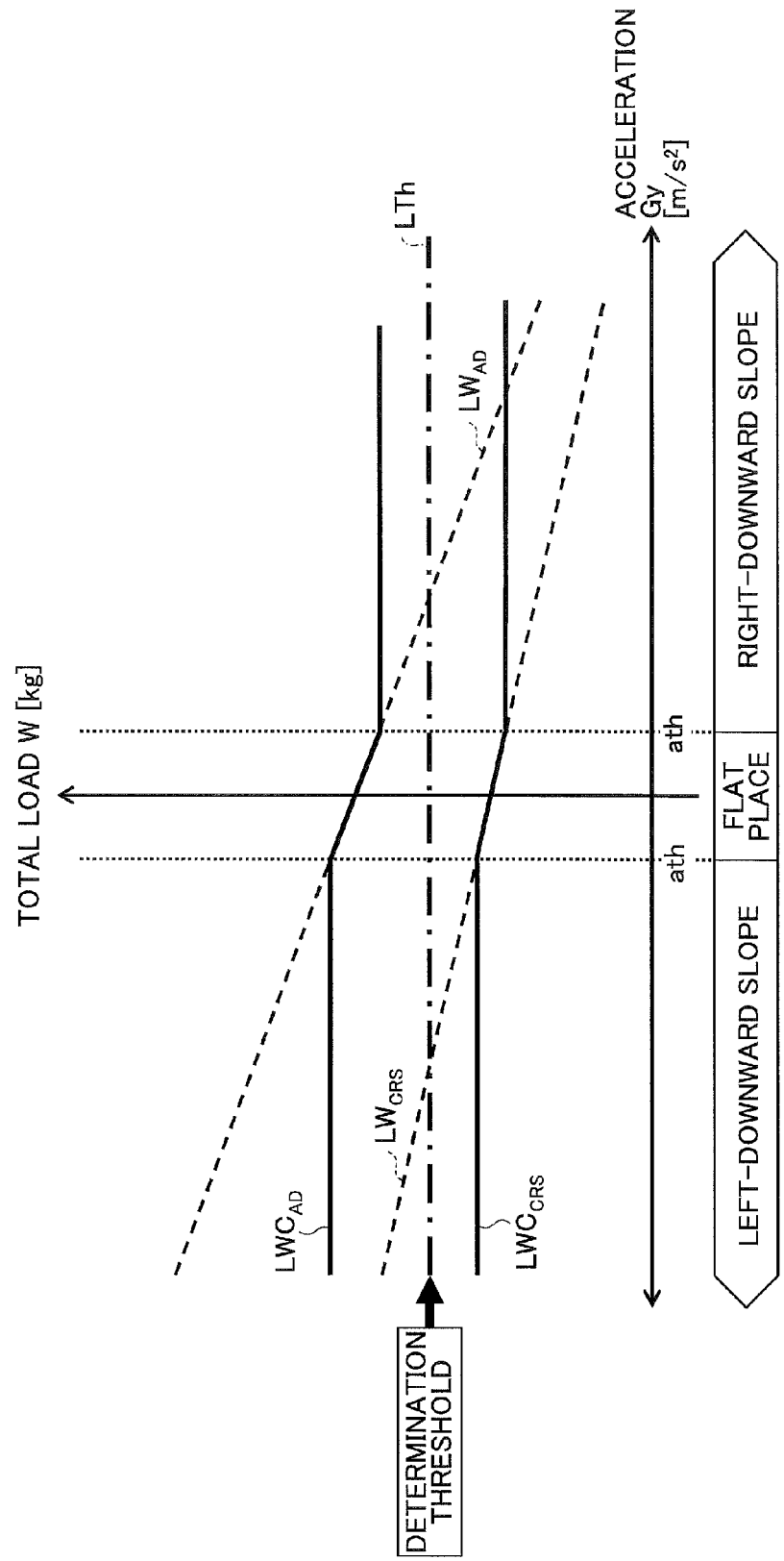
FIG. 4 illustrates one example of a method of correcting a load detected by the load sensor.

As a result, as shown in FIG. 4, the load W (the broken line $LW_{AD}$) corresponding to an adult who is seated on the seat 80 becomes less than the determination threshold (the alternate long and short dash line LTh) as a right-download slope becomes steeper by a certain amount. Therefore, if the type of the load object on the seat 80 is determined from a comparison between the load W and the determination threshold, an erroneous determination may occur. Similarly, the load W (the broken line $LW_{CRS}$) corresponding to an infant seated on a child seat lashed to the seat 80 becomes greater than the determination threshold (the alternate long and short dash line LTh) as a left-download slope becomes steeper by a certain amount. Therefore, if the type of the load object on the seat 80 is determined from a comparison between the load W and the determination threshold, an erroneous determination may occur.

In order to avoid such an erroneous determination, the load correction part 72 corrects the load W detected by the load sensors 50 and 60 according to an inclination degree of the vehicle 100 in a leftward or rightward direction (in this example, the lateral acceleration Gy) by increasing or decreasing it. In the example of FIG. 4, it is determined that the range of the absolute value of the lateral acceleration Gy smaller than the predetermined acceleration "ath" corresponds to a flat place, whereas the load W is corrected for the range where the absolute value of the lateral acceleration Gy is greater than or equal to the predetermined acceleration "ath". Specifically, in the range where the lateral acceleration Gy has an absolute value greater than or equal the predetermined acceleration "ath" in the leftward direction, the load correction part 72 carries out such a correction that a value corresponding to the absolute value of the lateral acceleration Gy is subtracted from the load W detected by the load sensors 50 and 60 so that the corrected load WC is kept approximately constant with respect to a change in the lateral acceleration Gy. On the other hand, in the range where the lateral acceleration Gy has an absolute value greater than or equal the predetermined acceleration "ath" in the rightward direction, the load correction part 72 carries out such a correction that a value corresponding to the absolute value of the lateral acceleration Gy is added to the load W detected by the load sensors 50 and 60 so that the corrected load WC is kept approximately constant with respect to a change in the lateral acceleration Gy.

As a result, the corrected load WC acquired from thus correcting the load W corresponding to an adult seated on the seat 80 does not become less than the determination threshold on a right-download slope. Also, the corrected load WC acquired from thus correcting the load W corresponding to an infant seated on a child seat lashed to the seat 80 does not become greater than the determination threshold on a left-download slope. In other words, it is possible to avoid an erroneous determination otherwise occurring due to an inclination of the vehicle 100 in a leftward or rightward direction when a load object determination is made based on the load detected by the load sensors 50 and 60.

Note that the specific method of correcting the load W detected by the load sensors 50 and 60 by the load correction part 72 is not limited thereto. It is also possible to instead use any method as long as the load W is corrected depending on an inclination degree of the vehicle 100 in a leftward or rightward direction so that the a load object determination that will be described later can be made correctly.

The load correction part 72 outputs the load W as the corrected load WC when the load W detected by the load sensors 50 and 60 is not corrected in such a case where the absolute value of the lateral acceleration Gy is less than the predetermined acceleration "ath" shown in FIG. 4.

Returning to FIG. 1, the load object determination part 73 carries out a process (a load object determination process) of determining the type of the load object on the seat 80. The load object determination part 73 carries out a load object determination using a corrected load WC that is output from the load correction part 72 as a load for determination WD in a case where the corrected load WC from the load correction part 72 is available, i.e., under the condition where the load correction part 72 outputs the corrected load WC. On the other hand, the load object determination part 73 carries out a load object determination using a load W calculated by the load calculation part 71 (detected by the load sensors 50 and 60) as a load for determination WD in a case where a corrected load WC from the load correction part 72 is not available, i.e., under the condition where the load correction part 72 does not output a corrected load WC.

Note that "a case where the corrected load WC from the load correction part 72 is available" means a normal case. "A case where the corrected load WC from the load correction part 72 is not available" corresponds to, for example, a case immediately after IG-ON in the vehicle 100, where the G sensor 40 is not capable of detecting a precise value, where, due to an initialization process of the ECU 70 or so, the start of a load correction process is delayed.

Now, a load object determination process by the load object determination part 73 will be described in detail.

Figure 5:
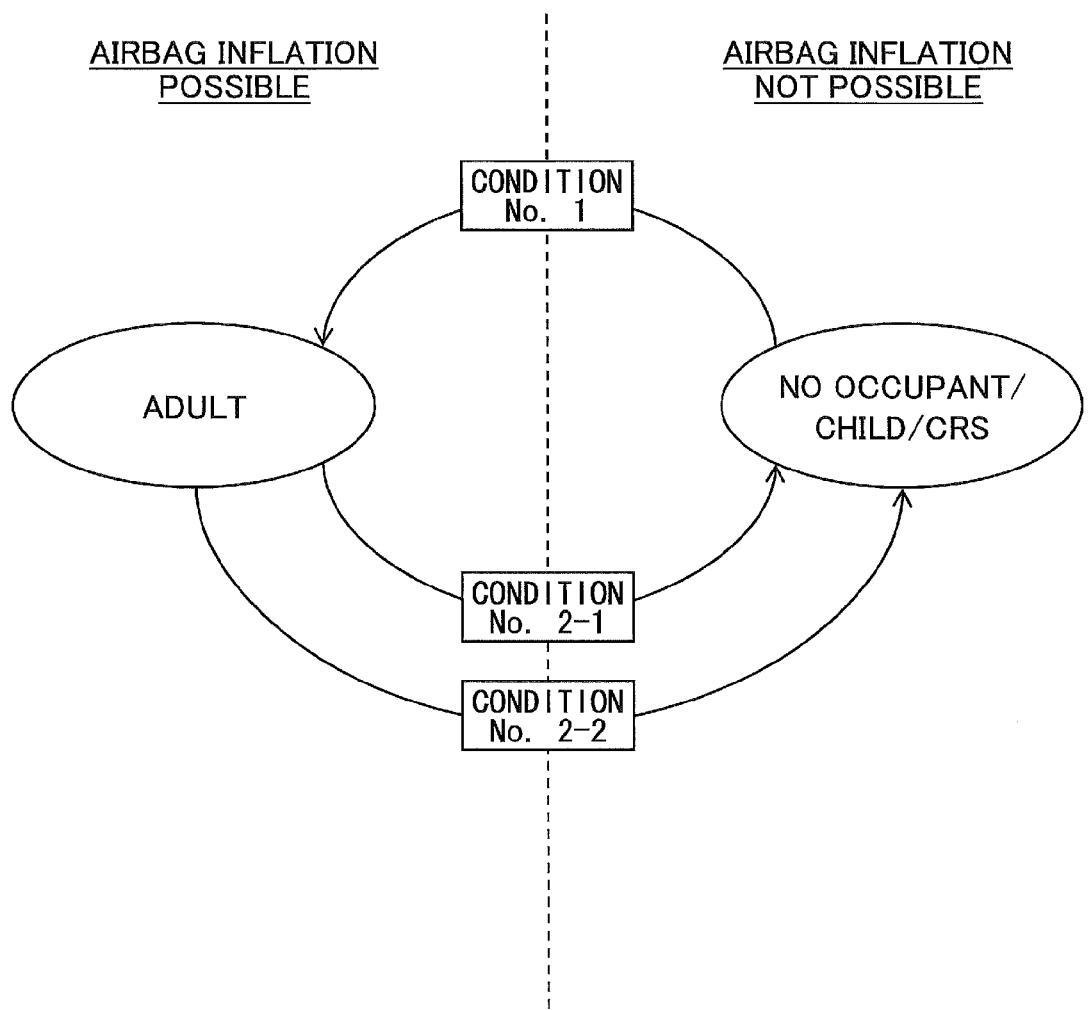
FIG. 5 is a state transition diagram illustrating transitions of a determined state in the load object determination apparatus according to a first embodiment.

FIG. 5 is a state transition diagram illustrating transitions of a determined state in the load object determination apparatus 1 (the load object determination part 73) according to the first embodiment. FIG. 6 illustrates determination conditions in the load object determination apparatus 1 (the load object determination part 73) according to the first embodiment.

As shown in FIG. 5, the load object determination apparatus 1 (the load object determination part 73) according to the first embodiment determines whether the load object on the seat 80 is an "adult" or "other than an adult (a child seat (CRS), a child, or no occupant)".

When determining that the load object on the seat 80 is an "adult", the load object determination part 73 transmits an airbag operation permission signal to another ECU (not shown) that carries out airbag inflation control allowing the airbag of the front passenger seat corresponding to the seat 80 to inflate. Also, the load object determination part 73 turns on an indicator lamp (A/B ON lamp) (not shown) in the vehicle interior indicating that inflation of the airbag is possible (an operation permitted state) together with thus transmitting the airbag operation permission signal.

On the other hand, when determining that the load object on the seat 80 is "other than an adult", the load object determination part 73 transmits an airbag operation prohibition signal to the ECU that carries out airbag inflation control not allowing the airbag of the front passenger seat corresponding to the seat 80 to inflate. Also, the load object determination part 73 turns on an indicator lamp (A/B OFF lamp) (not shown) in the vehicle interior indicating that inflation of the airbag is not possible (an operation prohibited state) together with transmitting the airbag operation prohibition signal.

Note that an "adult" in the load object determination means an adult who has the physique (the weight) greater than or equal to a small woman. A "child seat" in the load object determination means a child seat lashed to the seat 80 for holding an infant and includes a case where an infant is seated on the child seat. Also, a "child" in the load object determination means a child who does not wear a seat belt. The reason, when the load object on the seat 80 is "other than an adult", the airbag is prevented from inflating, is that the shock by the airbag to the child seat may give an adverse effect to the lashed infant or child, and the airbag is not necessary at a time of "no occupant".

It is also possible that the ECU 70 itself carries out airbag inflation control. In this case, it is possible that the load object determination part 73 does not transmit the airbag operation permission signal and the operation prohibition signal to another ECU and the ECU 70 itself allows or does not allow the airbag's operation depending on the load object determination result. This way is also applicable to the variant(s) and the embodiment(s) described later.

As shown in FIG. 5, when a condition No. 1 is satisfied in a predetermined timing of a determined state "other than an adult" (after the load object on the seat 80 is determined as "other than an adult" in the last load object determination), the load object determination part 73 determines that the load object on the seat 80 is an "adult". As shown in FIG. 6, the condition No. 1 for changing a determined state from "other than an adult" to "adult" is that "a state where the load for determination WD is greater than or equal to a determination threshold W1 continues for 1 second or more".

Note that the determination threshold W1 can be set, for example, as an intermediate value between the lower limit of the load W corresponding to a small woman and the upper limit of the load W corresponding to an infant seated on a child seat lashed to the seat 80, detected by the load sensors 50 and 60, while the vehicle 100 is in a horizontal state.

As shown in FIG. 5, when either a condition No. 2-1 or a condition 2-2 is satisfied in a predetermined timing in a determined state "adult" (after the load object on the seat 80 is determined as an "adult" in the last load object determination), the load object determination part 73 determines that the load object on the seat 80 is "other than an adult". As shown in FIG. 6, the condition No. 2-1 for changing a determined state from "adult" to "other than an adult" is that "a state where the load for determination WD is less than a determination threshold W2 continues for 5 seconds or more". The condition No. 2-2 for changing a determined state from an "adult" to "other than an adult" is that "a state where the load for determination WD is less than a determination threshold W3 and the lateral acceleration Gy indicates an absolute value greater than or equal to the predetermined acceleration "ath" in the leftward direction continues for 3 seconds or more".

Note that the determination threshold W2 is set to be less than the determination threshold W1. The determination threshold W3 is set to be greater than the determination threshold W2 and less than or equal to the determination threshold W1. That is, in the condition No. 2-1, by setting the determination threshold W2 less than the determination threshold W1 for changing a determined state from "other than an adult" to "adult", a transition from the determined state "adult" to "other than an adult" is not caused to occur easily. In the condition No. 2-2, as for the load for determination WD, the condition is eased in comparison to the condition No. 2-1, and a transition of a determined state from "adult" to "other than an adult" is caused to occur easily.

Note that the durations ("1 second", "5 seconds" and "3 seconds") included in the condition No. 1 to the condition No. 2-2 are examples of durations. For example, the durations can be appropriately set from a viewpoint of avoiding an erroneous determination due to a change in the posture of an occupant on the seat 80 or so.

Next, functions of the load object determination apparatus 1 according to the first embodiment will be described.

In the load object determination apparatus 1 according to the first embodiment, at least when the load for determination WD is greater than or equal to the determination threshold W1, the load object on the seat 80 is determined as an "adult". At least when the load for determination WD is less than the determination threshold W2 (<"the determination threshold W1"), the load object on the seat 80 is determined as "other than an adult". That is, a predetermined difference (a hysteresis width) is provided such that, with respect to the determination threshold W1 (an intermediate value between "adult" and "other than an adult") for determining that a load object on the seat 80 is an "adult", the determination threshold W2 for determining the load object on the seat 80 as "other than an adult" is smaller. Therefore, even if, for example, an "adult" on the seat 80 changes his or her posture and the shared load (the load W) on the supporting parts of the seat 80 at which the load sensors 50 and 60 are installed is reduced, it is possible not to cause an erroneous determination of the load object on the seat 80 as "other than an adult" to occur easily.

Further, the load object determination apparatus 1 according to the first embodiment determines that the load object on the seat 80 is "other than an adult" when a state where the load for determination WD is less than the determination threshold W3 that is set to be less than or equal to the determination threshold W1 and greater than the determination threshold W2 and the lateral acceleration Gy indicates an absolute value greater than or equal to the predetermined acceleration "ath" in the leftward direction continues for a predetermined period of time or more. Thus, when the vehicle 100 is inclined in a left-download manner (inclined in such a manner that the side having the load sensors 50 and 60 installed becomes lower) greater than or equal to a predetermined amount, the condition concerning the load for determination WD is eased ("the determination threshold W3">"the determination threshold W2") and it is determined whether the load object on the seat 80 is "other than an adult". Thereby, when the vehicle 100 is on a left-downward slope, even if the load object of "other than an adult" is erroneously determined as an "adult" immediately after IG-ON, it is possible to correctly determine thereafter that the load object on the seat 80 is "other than an adult" by using the thus eased determination threshold W3 when the corrected load WC becomes available several seconds after IG-ON.

Using FIG. 7, a description will now be made more specifically.

Figure 7:
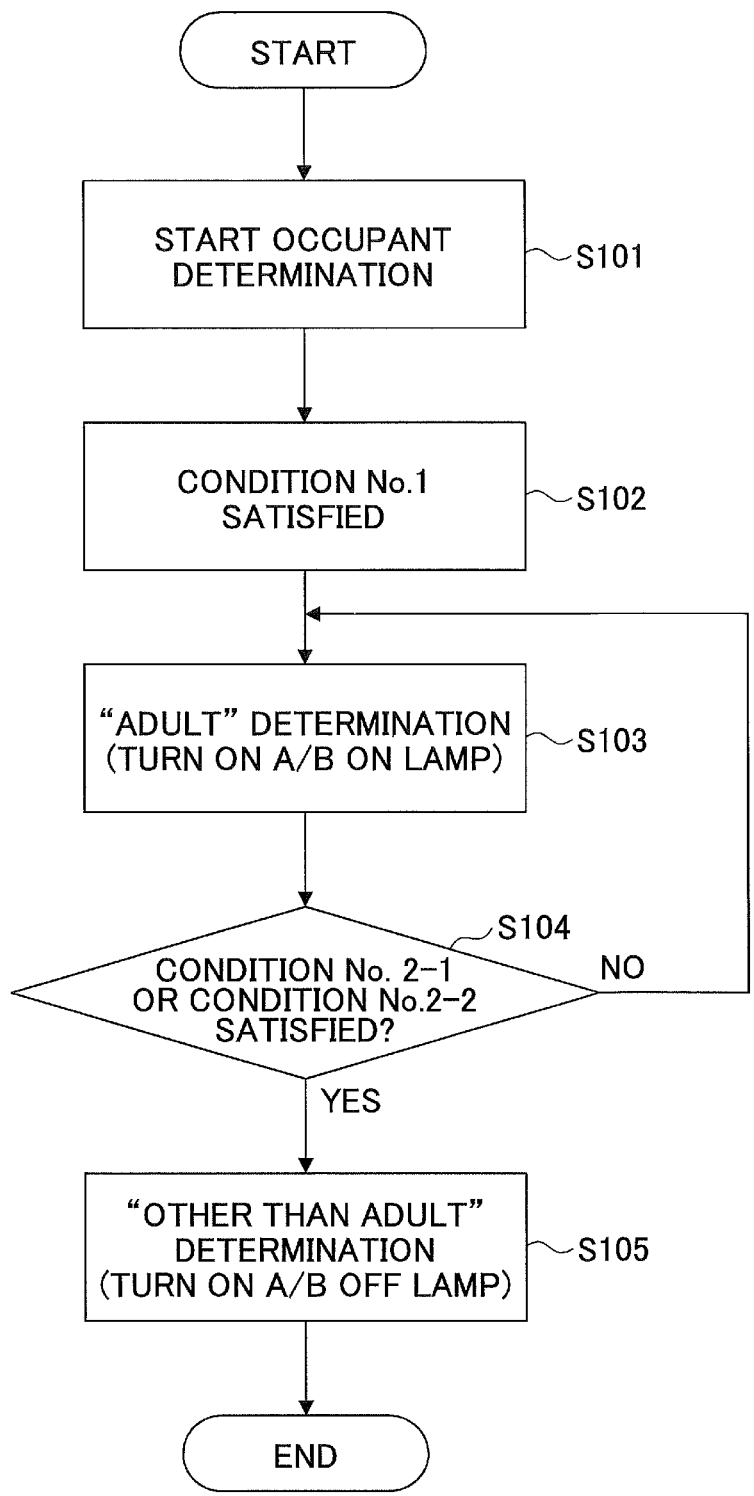
FIG. 7 is a flowchart illustrating one example of a flow of making a correct determination (a determined state "other than an adult") after making an erroneous determination (a determined state "adult") in the load object determination apparatus according to the first embodiment.

FIG. 7 is a flowchart illustrating one example of a flow of making a correct determination (a determined state "other than an adult") after making an erroneous determination (a determined state "adult") in the load object determination apparatus 1 (the load object determination part 73) according to the first embodiment.

Note that, now, it will be assumed that, at a time of IG-ON, the vehicle 100 is parked on a left-downward slope corresponding to a state where the lateral acceleration Gy indicates an absolute value greater than or equal to the predetermined acceleration "ath" in the leftward direction. It will be also assumed that, at the time of IG-ON, a child seat is lashed to the seat 80, i.e., the load object on the seat 80 is "other than an adult". Also, at the time of IG-ON of the vehicle 100, the load object determination part 73 makes a setting of the load object on the seat 80 being "other than an adult" as an initial state.

First, the load object determination part 73 starts a load object determination at the time of IG-ON of the vehicle 100 (Step S101).

As described above, it is not possible to use the corrected load WC from the load correction part 72 immediately after IG-ON. Therefore, the load object determination part 73 carries out the load object determination using a load W detected by the load sensors 50 and 60. As a result, because the vehicle 100 is stopped on the left-downward slope and the load W detected by the load sensors 50 and 60 is increased in comparison to a flat place, the load W as the load for determination WD is greater than or equal to the determination threshold W1 and the Condition No. 1 for changing a determined state from "other than an adult" to "adult" is satisfied (Step S102).

As a result, because the condition No. 1 is thus satisfied, the load object determination part 73 determines that the load object on the seat 80 is an "adult", and turns on the indicator lamp (A/B ON lamp) in the vehicle interior indicating that the airbag is in an inflation possible state (an operation permitted state) (Step S103).

Next, the load object determination part 73 determines whether the condition No. 2-1 or the condition No. 2-2 for changing a determined state from "adult" to "other than an adult" is satisfied (Step S104). If the corrected load WC from the load correction part 72 is still not available, neither the condition No. 2-1 nor the condition No. 2-2 is satisfied (NO in Step S104). Therefore, the load object determination part 73 maintains the determined state "adult" (Step S103).

Here, when the corrected load WC from the load correction part 72 becomes available, the corrected load WC corrected according to the left-download inclination of the vehicle 100 becomes at least less than the determination threshold W1. However, when the difference between the determination threshold W1 and the determination threshold W2 is set to be greater for the purpose of avoiding an erroneous determination due to a change in the posture or so, there is a likelihood that even the corrected load WC does not become less than the determination threshold W2 (in other words, there is a likelihood that the condition No. 2-1 cannot be satisfied). On the other hand, by using the determination threshold W3 (>"the determination threshold W2") that is set appropriately in consideration only of a case where the vehicle 100 is inclined in a left-download manner greater than or equal to a predetermined amount (a state where the lateral acceleration Gy indicates an absolute value greater than or equal to the predetermined acceleration "ath" in the leftward direction), the corrected load WC becomes less than the determination threshold W3. Therefore, the condition No. 2-2 is satisfied (YES in Step S104), the load object determination part 73 then determines that the load object on the seat 80 is "other than an adult", and turns on the indicator lamp (A/B OFF lamp) in the vehicle interior indicating the airbag inflation not possible state (operation prohibited state) (Step S105).

Thus, according to the load object determination apparatus 1 in the first embodiment, even if an erroneous determination is made that the load object on the seat 80 is an "adult" when the vehicle 100 is stopped on a left-downward slope or so immediately after IG-ON, it is possible to thereafter determine the load object on the seat 80 as "other than an adult" correctly. Also, according to the load object determination apparatus 1 in the first embodiment, the condition for determining the load object on the seat 80 to be "other than an adult" is that the load for determination WD is less than the determination threshold W3, the lateral acceleration Gy indicates an absolute value greater than or equal to the predetermined acceleration "ath" in the leftward direction, and also, this state continues for the predetermined period of time or more. Therefore, it is possible to avoid an erroneous determination otherwise occurring when the conditions concerning the load for determination WD and the lateral acceleration Gy are temporarily satisfied due to a change in the posture or so, and it is possible to further improve the determination accuracy.

Note that, a likelihood that an "adult" on the seat 80 is erroneously determined as "other than an adult" due to easing the determination threshold W2 into the determination threshold W3 and determining whether the load object on the seat 80 is "other than an adult" is very low, as will now be described. That is, in order that the load object determination part 73 erroneously determines an "adult" on the seat 80 as "other than an adult", it is necessary that the "adult" on the seat 80 moves to the right side of the seat 80 in his or her center of gravity (opposite to the side of the supporting parts at which the load sensors 50 and 60 are installed) and thus the load W detected by the load sensors 50 and 60 is reduced. However, when the vehicle 100 is inclined greater than or equal to the predetermined amount in the left-download manner (in a state where the lateral acceleration Gy indicates an absolute value greater than or equal to the predetermined acceleration "ath" in the leftward direction), it is difficult for the occupant to move his or her center of gravity to the right side of the seat 80 unless he or she does so intentionally. Therefore, the corresponding erroneous determination hardly occurs.

In summary, according to the load object determination apparatus 1 in the first embodiment, it is possible to avoid an erroneous determination of an occupant otherwise occurring due to a change in the posture or so (an erroneous determination of an "adult" as "other than an adult"), and also, it is possible to make a correct determination (as "other than an adult") thereafter even when first making an erroneous determination due to the vehicle 100 being stopped on a slope or so (an erroneous determination of "other than an adult" as an "adult").

[Variant]

Next, a variant of the first embodiment will be described.

The variant is different from the first embodiment mainly in that "other than an adult" is classified into a "child seat" and "no occupant (including a child)", and the load object determination apparatus 1 determines whether the load object on the seat is an "adult", a "child seat" or "no occupant". Below, for components/parts the same as or similar to those of the first embodiment, the same reference signs are given, and description will be made in a manner of focusing on different parts.

The configuration of the load object determination apparatus 1 according to the variant is shown in FIGS. 1 and 2, the same as or similar to the first embodiment.

In the same way as the first embodiment, the load object determination part 73 carries out a load object determination using a corrected load WC that is output from the load correction part 72 as a load for determination WD in a case where the corrected load WC from the load correction part 72 is available, i.e., under the condition where the load correction part 72 outputs the corrected load WC. On the other hand, the load object determination part 73 carries out a load object determination using a load W calculated by the load calculation part 71 (detected by the load sensors 50 and 60) as a load for determination WD in a case where a corrected load WC from the load correction part 72 is not available, i.e., under the condition where the load correction part 72 does not output a corrected load WC.

The load object determination process by the load object determination part 73 will now be described in detail.

Figure 8:
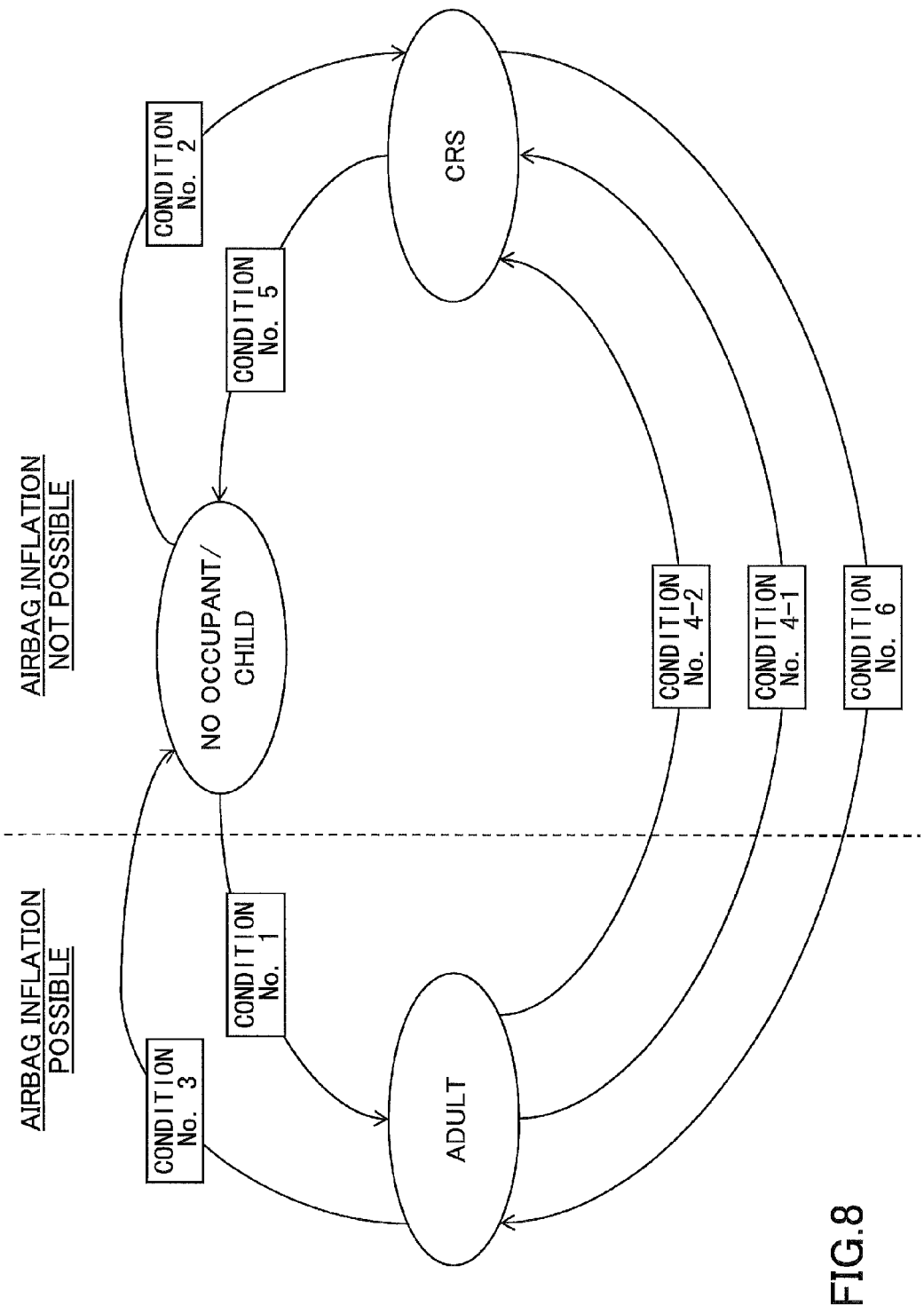
FIG. 8 is a state transition diagram illustrating transitions of a determined state in a load object determination apparatus according to a variant of the first embodiment.

FIG. 8 is a state transition diagram illustrating transitions of a determined state in the load object determination apparatus 1 (the load object determination part 73) according to the variant. FIG. 9 illustrates determination conditions for the load object determination apparatus 1 (the load object determination part 73) according to the variant.

As shown in FIG. 8, the load object determination apparatus 1 (the load object determination part 73) according to the variant determines whether the load object on the seat 80 is an "adult", "a child seat (CRS)" or "no occupant (including a child)".

When determining that the load object on the seat 80 is an "adult", the load object determination part 73 transmits an airbag operation permission signal to another ECU (not shown) that carries out airbag inflation control to allow the airbag of the front passenger seat corresponding to the seat 80 to inflate. Also, the load object determination part 73 turns on an indicator lamp (A/B ON lamp) (not shown) in the vehicle interior indicating that inflation of the airbag is possible (operation permitted state) together with thus transmitting the airbag operation permission signal.

On the other hand, when determining that the load object on the seat 80 is a "child seat" or "no occupant", the load object determination part 73 transmits an airbag operation prohibition signal to the other ECU that carries out airbag inflation control not to allow the airbag of the front passenger seat corresponding to the seat 80 to inflate. Also, the load object determination part 73 turns on an indicator lamp (A/B OFF lamp) (not shown) in the vehicle interior indicating that inflation of the airbag is not possible (operation prohibited state) together with transmitting the airbag operation prohibition signal.

As shown in FIG. 8, when a condition No. 1 is satisfied in a predetermined timing in a determined state "no occupant" (after the load object on the seat 80 is determined as "no occupant" in the last load object determination), the load object determination part 73 determines that the load object on the seat 80 is an "adult". As shown in FIG. 9, the condition No. 1 for changing a determined state from "no occupant" to "adult" is that "a state where the buckle signal from the buckle switch 30 is in an ON state (a seat belt wearing state) and the load for determination WD is greater than or equal to a determination threshold W1 continues for 1 second or more".

Also, as shown in FIG. 8, when a condition No. 2 is satisfied in a predetermined timing in a determined state "no occupant" (after the load object on the seat 80 is determined as "no occupant" in the last load object determination), the load object determination part 73 determines that the load object on the seat 80 is a "child seat". As shown in FIG. 9, the condition No. 2 for changing a determined state from "no occupant" to "child seat" is that "a state where the buckle signal from the buckle switch 30 is in an ON state (a seat belt wearing state) and the load for determination WD is less than the determination threshold W1 continues for 5 seconds or more".

Also, as shown in FIG. 8, when a condition No. 3 is satisfied in a predetermined timing in a determined state "adult" (after the load object on the seat 80 is determined as an "adult" in the last load object determination), the load object determination part 73 determines that the load object on the seat 80 is "no occupant". As shown in FIG. 9, the condition No. 3 for changing a determined state from "adult" to "no occupant" is that "a state where the buckle signal from the buckle switch 30 is in an OFF state (a seat belt not wearing state) and the load for determination WD is less than a determination threshold W2 continues for 5 seconds or more".

Also, as shown in FIG. 8, when a condition No. 4-1 or a condition No. 4-2 is satisfied in a predetermined timing in a determined state "adult" (after the load object on the seat 80 is determined as an "adult" in the last load object determination), the load object determination part 73 determines that the load object on the seat 80 is a "child seat". As shown in FIG. 9, the condition No. 4-1 for changing a determined state from "adult" to "child seat" is that "a state where "the buckle signal from the buckle switch 30 is in an ON state (a seat belt wearing state) and the load for determination WD is less than the determination threshold W2 continues for 5 seconds or more". The condition No. 4-2 for changing a determined state from "adult" to "child seat" is that "a state where the buckle signal from the buckle switch 30 is an ON state (a seat belt wearing state), the load for determination WD is less than a determination threshold W3 and the lateral acceleration Gy indicates an absolute value greater than or equal to the predetermined acceleration "ath" in the leftward direction continues for 3 seconds or more".

Also, as shown in FIG. 8, when a condition No. 5 is satisfied in a predetermined timing in a determined state "child seat" (after the load object on the seat 80 is determined as a "child seat" in the last load object determination), the load object determination part 73 determines that the load object on the seat 80 is "no occupant". As shown in FIG. 9, the condition No. 5 for changing a determined state from "child seat" to "no occupant" is that "the buckle signal from the buckle switch 30 is in an OFF state (a seat belt not wearing state)".

Also, as shown in FIG. 8, when a condition No. 6 is satisfied in a predetermined timing in a determined state "child seat" (after the load object on the seat 80 is determined as a "child seat" in the last load object determination), the load object determination part 73 determines that the load object on the seat 80 is an "adult". As shown in FIG. 9, the condition No. 6 for changing a determined state from "child seat" to "adult" is that "a state where the buckle signal from the buckle switch 30 is in an ON state (a seat belt wearing state) and the load for determination WD is greater than or equal to the determination threshold W1 continues for 5 seconds or more".

Note that the determination thresholds W1, W2 and W3 are the same as or similar to those in the first embodiment described above. That is, concerning the condition No. 3 or the condition No. 4-1, by setting the determination threshold W2 less than the determination threshold W1 for changing a determined state from "no occupant" or "child seat" to "adult", a transition of a determined state from "adult" to "no occupant" or "child seat" is not caused to occur easily. Concerning the condition No. 4-2, as for the load for determination WD, the condition is eased in comparison to the condition No. 4-1, and thus, a transition of a determined state from "adult" to "child seat" is caused to occur easily.

In the same manner as the first embodiment, the durations included in the condition No. 1 to the condition No. 6 are examples of durations. For example, the durations can be appropriately set from a viewpoint of avoiding an erroneous determination due to a change in the posture of an occupant on the seat 80 or so.

Next, functions of the load object determination apparatus 1 according to the variant will be described.

In the load object determination apparatus 1 according to the variant, at least when the load for determination WD is greater than or equal to the determination threshold W1, the load object on the seat 80 is determined as an "adult". At least when the load for determination WD is less than the determination threshold W2 (<"the determination threshold W1"), the load object on the seat 80 is determined as a "child seat". That is, a predetermined difference (a hysteresis width) is provided such that, with respect to the determination threshold W1 (an intermediate value between "adult" and "child seat") for determining that the load object on the seat 80 is an "adult", the determination threshold W2 for determining the load object on the seat 80 to be a "child seat" is smaller. Therefore, even if, for example, an "adult" on the seat 80 changes his or her posture and the shared load (the load W) on the supporting parts of the seat 80 at which the load sensors 50 and 60 are installed is reduced, it is possible not to cause an erroneous determination of the load object on the seat 80 as a "child seat" to occur easily.

Further, the load object determination apparatus 1 according to the variant determines that the load object on the seat 80 is a "child seat", when a seat belt wearing state and a state where the load for determination WD is less than the determination threshold W3 that is set to be less than or equal to the determination threshold W1 and greater than the determination threshold W2 and the lateral acceleration Gy indicates an absolute value greater than or equal to the predetermined acceleration "ath" in the leftward direction continue for a predetermined period of time or more. Thus, when the vehicle 100 is inclined in a left-download manner (inclined in such a manner that the side having the load sensors 50 and 60 installed becomes lower) greater than or equal to a predetermined amount, the condition concerning the load for determination WD is eased ("the determination threshold W3">"the determination threshold W2") and it is determined whether the load object on the seat 80 is a "child seat". Thereby, when the vehicle 100 is on a left-downward slope, even if the load object of a "child seat" is erroneously determined as an "adult" immediately after IG-ON, it is possible to correctly determine thereafter that the load object on the seat 80 is a "child seat" by using the thus eased determination threshold W3 when the corrected load WC becomes available several seconds after IG-ON.

Using FIG. 10, a description will now be made more specifically.

Figure 10:
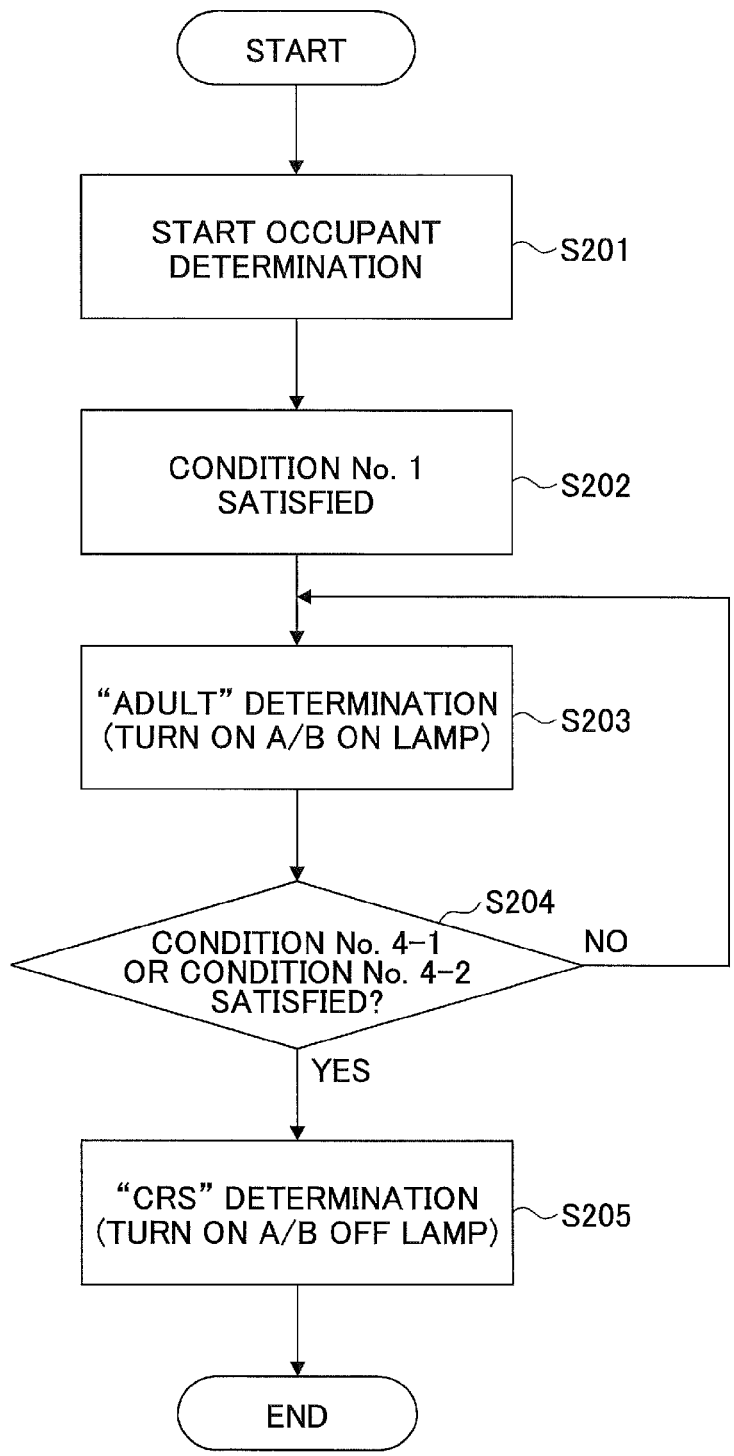
FIG. 10 is a flowchart illustrating one example of a flow of making a correct determination (a determined state "child seat") after making an erroneous determination (a determined state "adult") in the load object determination apparatus according to the variant of the first embodiment.

FIG. 10 is a flowchart illustrating one example of a flow of making a correct determination (a determined state "child seat") after making an erroneous determination (a determined state "adult") in the load object determination apparatus 1 (the load object determination part 73) according to the variant.

Note that, now, it will be assumed that, at a time of IG-ON, the vehicle 100 is parked on a left-downward slope corresponding to a state where the lateral acceleration Gy indicates an absolute value greater than or equal to the predetermined acceleration "ath" in the leftward direction. It will be also assumed that, at the time of IG-ON, a child seat is lashed to the seat 80, i.e., the load object on the seat 80 is a "child seat". Also, at the time of IG-ON of the vehicle 100, the load object determination part 73 makes a setting of the load object on the seat 80 being "no occupant" as an initial state.

First, the load object determination part 73 starts a load object determination at the time of IG-ON of the vehicle 100 (Step S201).

As described above, it is not possible to use the corrected load WC from the load correction part 72 immediately after IG-ON. Therefore, the load object determination part 73 carries out the load object determination using a load W detected by the load sensors 50 and 60. As a result, because the vehicle 100 is stopped on the left-downward slope and the load W detected by the load sensors 50 and 60 is increased in comparison to a flat place, the load W as the load for determination WD is greater than or equal to the determination threshold W1 and the Condition No. 1 for changing a determined state from "no occupant" to "adult" is satisfied (Step S202).

As a result, because the condition No. 1 is thus satisfied, the load object determination part 73 determines that the load object on the seat 80 is an "adult", and turns on the indicator lamp (A/B ON lamp) in the vehicle interior indicating that the airbag is in an inflation possible state (an operation permitted state) (Step S203).

Next, the load object determination part 73 determines whether the condition No. 4-1 or the condition No. 4-2 for changing a determined state from "adult" to "child seat" is satisfied (Step S204). If the corrected load WC from the load correction part 72 is still not available, neither the condition No. 4-1 nor the condition No. 4-2 is satisfied (NO in Step S204). Therefore, the load object determination part 73 maintains the determined state "adult" (Step S203).

Here, when the corrected load WC from the load correction part 72 becomes available, the corrected load WC corrected according to the left-download inclination of the vehicle 100 is at least less than the determination threshold W1. However, when the difference between the determination threshold W1 and the determination threshold W2 is set to be greater for the purpose of avoiding an erroneous determination due to a change in the posture or so, there is a likelihood that even the corrected load WC does not become less than the determination threshold W2 (in other words, there is a likelihood that the condition No. 4-1 cannot be satisfied). On the other hand, by using the determination threshold W3 (>"the determination threshold W2") that is set appropriately in consideration only of a case where the vehicle 100 is inclined in a left-download manner greater than or equal to a predetermined amount (a state where the lateral acceleration Gy indicates an absolute value greater than or equal to the predetermined acceleration "ath" in the leftward direction), the corrected load WC becomes less than the determination threshold W3. Therefore, the condition No. 4-2 is satisfied (YES in Step S204), the load object determination part 73 then determines that the load object on the seat 80 is a "child seat", and turns on the indicator lamp (A/B OFF lamp) in the vehicle interior (Step S205).

Thus, according to the load object determination apparatus 1 in the variant, even if an erroneous determination is made that the load object on the seat 80 is an "adult" when the vehicle 100 is stopped on a left-downward slope or so immediately after IG-ON, it is possible to thereafter determine the load object on the seat 80 to be a "child seat" correctly.

In summary, according to the load object determination apparatus 1 in the variant, it is possible to avoid an erroneous determination of an occupant otherwise occurring due to a change in the posture or so (an erroneous determination of an "adult" as a "child seat"), and also, it is possible to make a correct determination (as a "child seat") thereafter even when first making an erroneous determination due to the vehicle 100 being stopped on a slope or so (an erroneous determination of a "child seat" as an "adult").

Second Embodiment

Next, a second embodiment will be described.

The load object determination apparatus 1 according to the second embodiment is different from the first embodiment in that in the condition No. 2-2 for changing a determined state from "adult" to "other than an adult", a condition of limiting a period of time is provided instead of the condition concerning the lateral acceleration Gy. Below, for components/parts the same as or similar to those of the first embodiment, the same reference signs are given, and description will be made in a manner of focusing on different parts.

The configuration of the load object determination apparatus 1 according to the second embodiment is shown in FIGS. 1 and 2, the same as or similar to the first embodiment.

In the same way as the first embodiment, the load object determination part 73 carries out a load object determination using a corrected load WC that is output from the load correction part 72 as a load for determination WD in a case where the corrected load WC from the load correction part 72 is available, i.e., under the condition where the load correction part 72 outputs the corrected load WC. On the other hand, the load object determination part 73 carries out a load object determination using a load W calculated by the load calculation part 71 (detected by the load sensors 50 and 60) as a load for determination WD in a case where a corrected load WC from the load correction part 72 is not available, i.e., under the condition where the load correction part 72 does not output a corrected load WC.

The load object determination process by the load object determination part 73 will now be described in detail.

FIG. 11 illustrates determination conditions for the load object determination apparatus 1 (the load object determination part 73) according to the second embodiment. Note that a state transition diagram illustrating transitions of a determined state in the load object determination apparatus 1 (the load object determination part 73) according to the second embodiment is shown in FIG. 5, similar to the first embodiment, and thus, a description will now be made using FIG. 5.

As shown in FIG. 5, when a condition No. 1 is satisfied in a predetermined timing in a determined state "other than an adult" (after the load object on the seat 80 is determined as "other than an adult" in the last load object determination), the load object determination part 73 determines that the load object on the seat 80 is an "adult". As shown in FIG. 11, the condition No. 1 for changing a determined state from "other than an adult" to "adult" is, the same as the condition No. 1 in the first embodiment, that "a state where the load for determination WD is greater than or equal to a determination threshold W1 continues for 1 second or more".

Also, as shown in FIG. 5, when either a condition No. 2-1 or a condition 2-2 is satisfied in a predetermined timing in a determined state "adult" (after the load object on the seat 80 is determined as an "adult" in the last load object determination), the load object determination part 73 determines that the load object on the seat 80 is "other than an adult". As shown in FIG. 11, the condition No. 2-1 for changing a determined state from an "adult" to "other than an adult" is, the same as the condition No. 2-1 in the first embodiment, that "a state where the load for determination WD is less than a determination threshold W2 continues for 5 seconds or more". The condition No. 2-2 for changing a determined state from an "adult" to "other than an adult" is that "a state where the load for determination WD is less than a determination threshold W3 continues for 3 seconds or more within 10 seconds from IG-ON of the vehicle 100".

Note that the determination thresholds W1, W2 and W3 are the same as or similar to those in the first embodiment described above. That is, concerning the condition No. 2-1, by setting the determination threshold W2 less than the determination threshold W1 for changing a determined state from "other than an adult" to "adult", a transition of a determined state from "adult" to "other than an adult" is not caused to occur easily. Concerning the condition No. 2-2, as for the load for determination WD, the condition is eased in comparison to the condition No. 2-1, and thus, a transition of a determined state from "adult" to "other than an adult" is caused to occur easily.

In the same manner as the first embodiment, the durations included in the condition No. 1 to the condition No. 2-2 are examples of durations. For example, the durations can be appropriately set from a viewpoint of avoiding an erroneous determination due to a change in the posture of an occupant on the seat 80 or so.

Next, functions of the load object determination apparatus 1 according to the second embodiment will be described.

In the load object determination apparatus 1 according to the second embodiment, the same as the first embodiment, at least when the load for determination WD is greater than or equal to the determination threshold W1, the load object on the seat 80 is determined as an "adult". At least when the load for determination WD is less than the determination threshold W2 (<"the determination threshold W1"), the load object on the seat 80 is determined as "other than an adult". Therefore, even if, for example, an "adult" on the seat 80 changes his or her posture and the shared load (the load W) on the supporting parts of the seat 80 at which the load sensors 50 and 60 are installed is reduced, it is possible not to cause an erroneous determination of the load object on the seat 80 as "other than an adult" to occur easily.

Further, the load object determination apparatus 1 according to the second embodiment determines that the load object on the seat 80 is "other than an adult", when a state where the load for determination WD is less than the determination threshold W3 that is set to be less than or equal to the determination threshold W1 and greater than the determination threshold W2 and the lateral acceleration Gy indicates an absolute value greater than or equal to the predetermined acceleration "ath" in the leftward direction continues for a predetermined period of time or more within a predetermined period of time (within 10 seconds) from IG-ON of the vehicle 100. Thus, the period of time is limited within the predetermined period of time (within 10 seconds) from IG-ON of the vehicle 100 and the condition concerning the load for determination WD is eased ("the determination threshold W3">"the determination threshold W2") and it is determined whether the load object on the seat 80 is "other than an adult". Thereby, when the vehicle 100 is on a left-downward slope (a slope where the side having the load sensors 50 and 60 installed is lower), even if the load object of "other than an adult" is erroneously determined as an "adult" immediately after IG-ON, it is possible to correctly determine thereafter that the load object on the seat 80 is "other than an adult" by using the thus eased determination threshold W3 within the predetermined period of time (within 10 seconds) from IG-ON when the corrected load WC becomes available several seconds after IG-ON.

Also, by limiting the period of time for determining whether the load object on the seat 80 is "other than an adult" using the eased determination threshold W3, it is possible to reduce the possibility of erroneously determining an "adult" on the seat 80 as "other than an adult". In particular, because the corrected load WC becomes available several seconds after IG-ON, it is possible to reduce, as much as possible, a likelihood of erroneously determining an "adult" on the seat 80 as "other than an adult", while providing an occasion to make a correct determination, by limiting the period of time to around 10 seconds as described above.

Thus, according to the load object determination apparatus 1 in the second embodiment, it is possible to avoid an erroneous determination of an occupant otherwise occurring due to a change in the posture or so (an erroneous determination of an "adult" as "other than an adult"), and also, it is possible to make a correct determination (as "other than an adult") thereafter even when first making an erroneous determination due to the vehicle 100 being stopped on a slope or so (an erroneous determination of "other than an adult" as an "adult").

Third Embodiment

Next, a third embodiment will be described.

The load object determination apparatus 1 according to the third embodiment is different from the first embodiment in that the load correction part 72 is not included and the load object determination part 73 carries out a load object determination always based on the load W calculated by the load calculation part 71 (i.e., detected by the load sensors 50 and 60). Also, the load object determination apparatus 1 according to the third embodiment is different from the first embodiment in that, in the above-described condition 2-2 for changing a determined state from "adult" to "other than an adult", a condition of limiting the period of time is provided instead of the condition concerning the lateral acceleration Gy, the same as the second embodiment. Below, for components/parts the same as or similar to those of the first embodiment, the same reference signs are given, and description will be made in a manner of focusing on different parts.

The configuration of the load object determination apparatus 1 according to the third embodiment is shown in FIGS. 1 and 2, similar to the first embodiment, except that the ECU 70 does not have the load correction part 72.

The load object determination part 73 carries out a load object determination using a load W calculated by the load calculation part 71 (detected by the load sensors 50 and 60).

The load object determination process by the load object determination part 73 will now be described in detail.

FIG. 12 illustrates determination conditions for the load object determination apparatus 1 (the load object determination part 73) according to the third embodiment. Note that a state transition diagram illustrating transitions of a determined state in the load object determination apparatus 1 (the load object determination part 73) according to the third embodiment is shown in FIG. 5, the same as the first embodiment, and thus, a description will now be made using FIG. 5.

As shown in FIG. 5, when a condition No. 1 is satisfied in a predetermined timing in a determined state "other than an adult" (after the load object on the seat 80 is determined as "other than an adult" in the last load object determination), the load object determination part 73 determines that the load object on the seat 80 is an "adult". As shown in FIG. 12, the condition No. 1 for changing a determined state from "other than an adult" to "adult" is that "a state where the load W detected by the load sensors 50 and 60 is greater than or equal to a determination threshold W1 continues for 1 second or more".

Also, as shown in FIG. 5, when either a condition No. 2-1 or a condition 2-2 is satisfied in a predetermined timing in a determined state "adult" (after the load object on the seat 80 is determined as an "adult" in the last load object determination), the load object determination part 73 determines that the load object on the seat 80 is "other than an adult". As shown in FIG. 12, the condition No. 2-1 for changing a determined state from an "adult" to "other than an adult" is, the same as the condition No. 2-1 in the first embodiment, that "a state where the load W detected by the load sensors 50 and 60 is less than or equal to a determination threshold W2 continues for 5 seconds or more". The condition No. 2-2 for changing a determined state from an "adult" to "other than an adult" is that "a state where the load W detected by the load sensors 50 and 60 is less than or equal to a determination threshold W3 continues for 3 seconds or more at a time of initial traveling after IG-ON of the vehicle 100.

Note that, "a time of travelling of the vehicle 100" means from the start of travelling of the vehicle 100 (for example, a state where the vehicle speed is greater than or equal to 10 km/h continues for 3 seconds or more) to stopping the vehicle 100 (for example, a state where the vehicle speed is less than 1 km/h continues for 1 second or more). For example, it is possible that the load object determination part 73 determines whether the condition 2-2 is satisfied by detecting a traveling state of the vehicle 100 based on the vehicle speed signal from the vehicle speed sensor 20 (for example, detecting the vehicle state after the vehicle speed greater than or equal to 10 km/h continues for 3 seconds or more until the vehicle speed less than 1 km/h continues for 1 second or more. That is, the load object determination part 73 determines that the load object on the seat 80 as "other than an adult" when a state where the load W is less than the determination threshold W3 continues for 3 seconds or more during the period of time from the start of initial traveling of the vehicle 100 after IG-ON to stopping the vehicle 100.

Note that the determination thresholds W1, W2 and W3 are the same as or similar to those in the first embodiment described above. That is, concerning the condition No. 2-1, by setting the determination threshold W2 less than the determination threshold W1 for changing a determined state from "other than an adult" to "adult", a transition of a determined state from "adult" to "other than an adult" is not caused to occur easily. Concerning the condition No. 2-2, as for the condition concerning the load W, the condition is eased in comparison to the condition No. 2-1, and thus, a transition of a determined state from "adult" to "other than an adult" is caused to occur easily.

The durations included in the condition No. 1 to the condition No. 2-2 are examples of durations, in the same manner as the first embodiment. For example, the durations can be appropriately set from a viewpoint of avoiding an erroneous determination due to a change in the posture of an occupant on the seat 80 or so.

Next, functions of the load object determination apparatus 1 according to the third embodiment will be described.

In the load object determination apparatus 1 according to the third embodiment, at least when the load W detected by the load sensors 50 and 60 is greater than or equal to the determination threshold W1, the load object on the seat 80 is determined as an "adult". At least when the load W detected by the load sensors 50 and 60 is less than the determination threshold W2 (<"the determination threshold W1"), the load object on the seat 80 is determined as "other than an adult". Therefore, even if, for example, an "adult" on the seat 80 changes his or her posture and the shared load (the load W) on the supporting parts of the seat 80 at which the load sensors 50 and 60 are installed is reduced, it is possible not to cause an erroneous determination of the load object on the seat 80 as "other than an adult" to occur easily.

The load object determination apparatus 1 according to the third embodiment determines that the load object on the seat 80 is "other than an adult" when a state where the load W is less than the determination threshold W3 that is set to be less than or equal to the determination threshold W1 and greater than the determination threshold W2 continues for a predetermined period of time during the period of time from the start of initial travelling of the vehicle 100 after IG-ON to stopping the vehicle 100. That is, when the vehicle 100 starts travelling, a likelihood of returning to a flat place is high. Therefore, a determination is made as to whether the load object on the seat 80 is "other than an adult" at a time of initial traveling after IG-ON of the vehicle 100 while the condition concerning the load W is eased ("the determination threshold W3">"the determination threshold W2"). Thereby, when the vehicle 100 is on a left-downward slope (a slope where the side having the load sensors 50 and 60 installed becomes lower), even if the load object of "other than an adult" is erroneously determined as an "adult" immediately after IG-ON, it is possible to make a correct determination thereafter during travelling of the vehicle 100 that the load object on the seat 80 is "other than an adult" using the determination threshold W3.

Also, by limiting the period of time for determining whether the load object on the seat 80 is "other than an adult" using the eased determination threshold W3, it is possible to reduce a likelihood of erroneously determining an "adult" on the seat 80 as "other than an adult".

Note that, in the above-described example, the period of time for determining whether the load object on the seat is "other than an adult" using the eased the determination threshold W3 is limited to a time of initial traveling of the vehicle 100. However, it is also possible to limit it to a predetermined number of times (for example, three times) of traveling after IG-ON.

Thus, in the load object determination apparatus 1 according to the third embodiment, it is possible to avoid an erroneous determination (determining an "adult" as "other than an adult") otherwise occurring due to a change in the posture or so, and also it is possible to thereafter make a correct determination (determining the load object on the seat 80 as "other than an adult") even when first making an erroneous determination (determining "other than an adult" as an "adult") due to the vehicle 100 being stopped on a slope or so.

Fourth Embodiment

Next, a fourth embodiment will be described.

The load object determination apparatus 1 according to the fourth embodiment is different from the first embodiment in that two conditions are provided for changing a determined state from "other than an adult" to "adult", and a determination threshold is set concerning a load for determination WD in such a manner as not to cause a transition of a determined state from "other than an adult" to "adult" to occur easily. Below, for components/parts the same as or similar to those of the first embodiment, the same reference signs are given, and description will be made in a manner of focusing on different parts.

The configuration of the load object determination apparatus 1 according to the fourth embodiment is shown in FIGS. 1 and 2, similar to the first embodiment.

In the same way as the first embodiment, the load object determination part 73 carries out a load object determination using a corrected load WC that is output from the load correction part 72 as a load for determination WD in a case where the corrected load WC from the load correction part 72 is available, i.e., under the condition where the load correction part 72 outputs the corrected load WC. On the other hand, the load object determination part 73 carries out a load object determination using a load W calculated by the load calculation part 71 (detected by the load sensors 50 and 60) as a load for determination WD in a case where a corrected load WC from the load correction part 72 is not available, i.e., under the condition where the load correction part 72 does not output a corrected load WC.

The load object determination process by the load object determination part 73 will now be described in detail.

Figure 13:
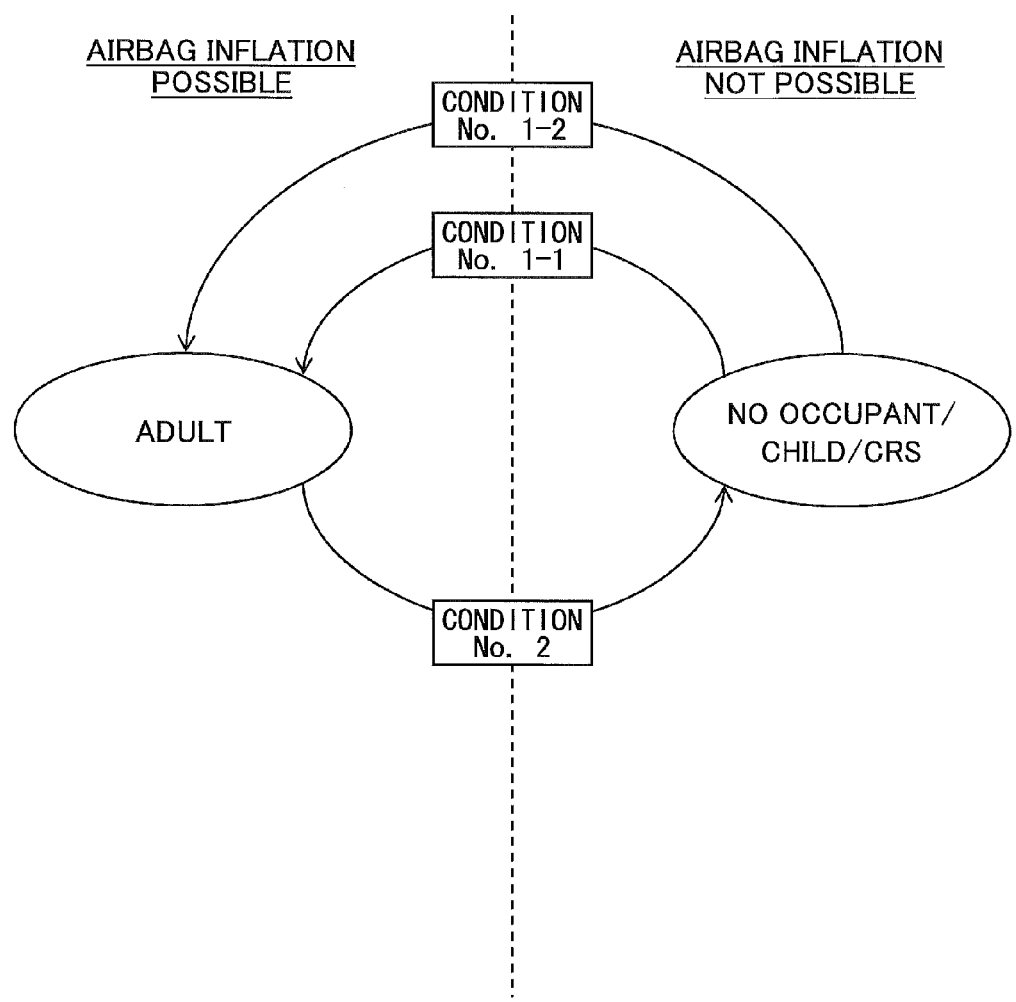
FIG. 13 is a state transition diagram illustrating transitions of a determined state in a load object determination apparatus according to a fourth embodiment.

FIG. 13 is a state transition diagram illustrating transitions of a determined state in the load object determination apparatus 1 (the load object determination part 73) according to the fourth embodiment. FIG. 14 illustrates determination conditions for the load object determination apparatus 1 (the load object determination part 73) according to the fourth embodiment.

As shown in FIG. 13, the load object determination apparatus 1 (the load object determination part 73) according to the fourth embodiment determines, the same as the first embodiment, whether the load object on the seat 80 is an "adult" or "other than an adult (a child seat (CRS), a child, or no occupant)".

As shown in FIG. 13, when a condition No. 2 is satisfied in a predetermined timing in a determined state "adult" (after the load object on the seat 80 is determined as an "adult" in the last load object determination), the load object determination part 73 determines that the load object on the seat 80 is "other than an adult". As shown in FIG. 14, the condition No. 2 for changing a determined state from "adult" to "other than an adult" is that "a state where the load for determination WD is less than a determination threshold W1 continues for 5 seconds or more".

Also, as shown in FIG. 13, when either a condition No. 1-1 or a condition 1-2 is satisfied in a predetermined timing in a determined state "other than an adult" (after the load object on the seat 80 is determined as "other than an adult" in the last load object determination), the load object determination part 73 determines that the load object on the seat 80 is an "adult". As shown in FIG. 14, the condition No. 1-1 for changing a determined state from "other than an adult" to "adult" is that "a state where the load for determination WD is greater than or equal to a determination threshold W4 continues for 1 second or more". The condition No. 1-2 for changing a determined state from "other than an adult" to "adult" is that "a state where the load for determination WD is greater than or equal to a determination threshold W5 and the lateral acceleration Gy indicates an absolute value greater than or equal to the predetermined acceleration "ath" in the rightward direction continues for 3 seconds or more".

Note that the determination threshold W1 is the same as the first embodiment. The determination threshold W4 is set to be greater than the determination threshold W1. The determination threshold W5 is set to be greater than or equal to the determination threshold W1 and less than the determination threshold W4. That is, in the condition No. 1-1, by setting the determination threshold W4 greater than the determination threshold W1 for changing a determined state from "adult" to "other than an adult", a transition from the determined state "other than an adult" to "adult" is not caused to occur easily. In the condition No. 1-2, as for the load for determination WD, the condition is eased in comparison to the condition No. 1-1, and a transition of a determined state from "other than an adult" to "adult" is caused to occur easily.

Note that the durations included in the condition No. 1-1 to the condition No. 2 are examples of durations, in the same manner as the first embodiment. For example, the durations can be appropriately set from a viewpoint of avoiding an erroneous determination due to a change in the posture of an occupant on the seat 80 or so.

Next, functions of the load object determination apparatus 1 according to the fourth embodiment will be described.

In the load object determination apparatus 1 according to the fourth embodiment, at least when the load for determination WD is less than the determination threshold W1, the load object on the seat 80 is determined as "other than an adult". At least when the load for determination WD is greater than or equal to the determination threshold W4 (>"the determination threshold W1"), the load object on the seat 80 is determined as an "adult". That is, a predetermined difference (a hysteresis width) is provided such that, with respect to the determination threshold W1 (an intermediate value between "adult" and "other than an adult") for determining that the load object on the seat 80 is "other than an adult", the determination threshold W4 for determining the load object on the seat 80 as an "adult" is greater. Therefore, even if, for example, an "adult" on the seat 80 changes his or her posture and the shared load (the load W) on the supporting parts of the seat 80 at which the load sensors 50 and 60 are installed is increased, it is possible not to cause an erroneous determination of the load object on the seat 80 as an "adult" to occur easily.

Further, the load object determination apparatus 1 according to the fourth embodiment determines that the load object on the seat 80 is an "adult" when a state where the load for determination WD is greater than or equal to the determination threshold W5 that is set to be greater than or equal to the determination threshold W1 and less than the determination threshold W4 and the lateral acceleration Gy indicates an absolute value greater than or equal to the predetermined acceleration "ath" in the rightward direction continues for a predetermined period of time or more. Thus, when the vehicle 100 is inclined in a right-downward manner (inclined in such a manner that the side opposite to the side having the load sensors 50 and 60 installed becomes lower) greater than or equal to a predetermined amount, the condition concerning the load for determination WD is eased ("the determination threshold W5"<"the determination threshold W4") and it is determined whether the load object on the seat 80 is an "adult". Thereby, when the vehicle 100 is on a right-downward slope, even if the load object of an "adult" is erroneously determined as "other than an adult" immediately after IG-ON, it is possible to correctly determine thereafter that the load object on the seat 80 is an "adult" by using the thus eased determination threshold W5 when the corrected load WC becomes available several seconds after IG-ON.

Using FIG. 15, a description will now be made more specifically.

Figure 15:
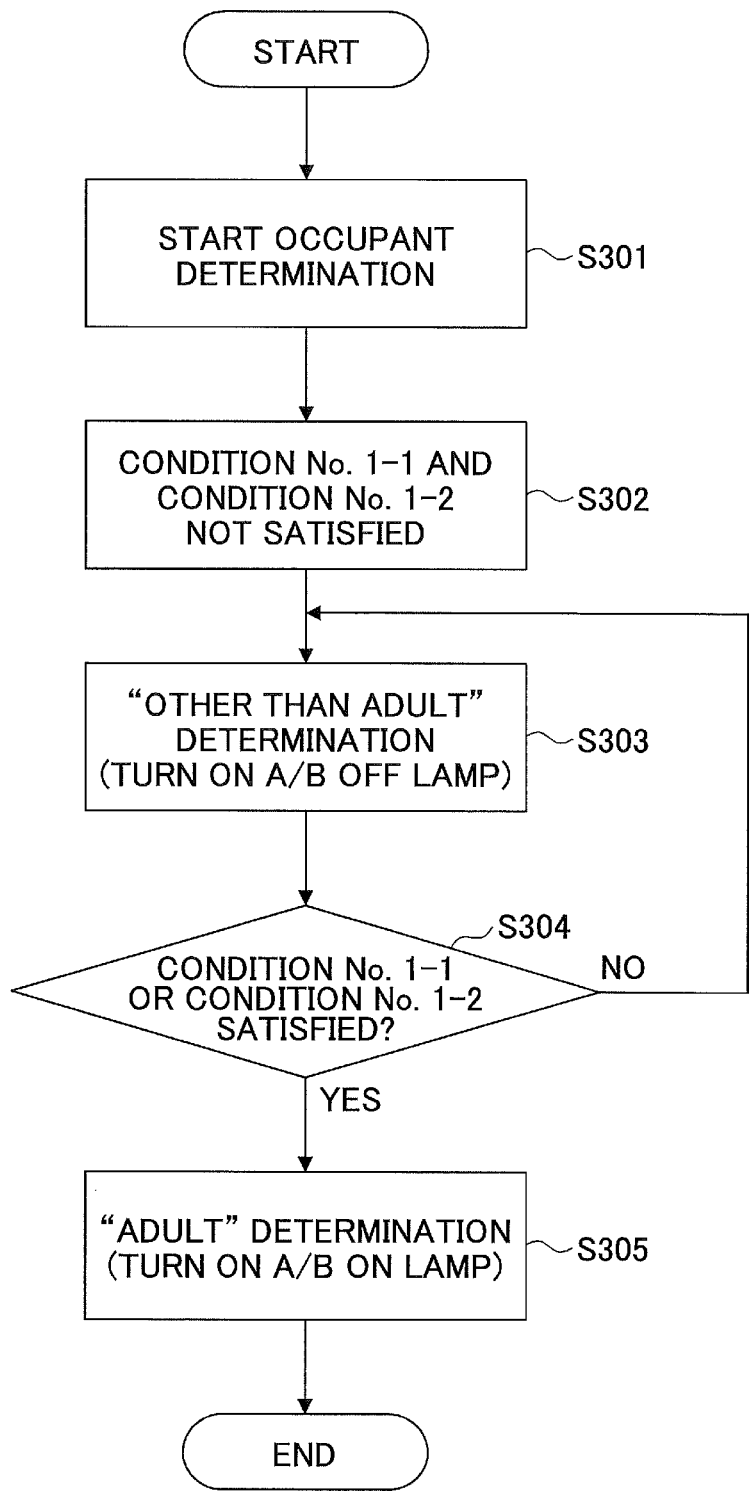
FIG. 15 is a flowchart illustrating one example of a flow of making a correct determination (a determined state "adult") after making an erroneous determination (a determined state "other than an adult") in the load object determination apparatus according to the fourth embodiment.

FIG. 15 is a flowchart illustrating one example of a flow of making a correct determination (a determined state "adult") after making an erroneous determination (a determined state "other than an adult") in the load object determination apparatus 1 (the load object determination part 73) according to the fourth embodiment.

Note that, now, it will be assumed that, at a time of IG-ON, the vehicle 100 is parked on a right-downward slope corresponding to a state where the lateral acceleration Gy indicates an absolute value greater than or equal to the predetermined acceleration "ath" in the rightward direction. It will be also assumed that, at the time of IG-ON, an adult is seated on the seat 80, i.e., the load object on the seat 80 is an "adult". Also, at the time of IG-ON of the vehicle 100, the load object determination part 73 makes a setting of the load object on the seat 80 being "other than an adult" as an initial state.

First, the load object determination part 73 starts a load object determination at the time of IG-ON of the vehicle 100 (Step S301).

As described above, it is not possible to use the corrected load WC from the load correction part 72 immediately after IG-ON. Therefore, the load object determination part 73 carries out the load object determination using a load W detected by the load sensors 50 and 60. As a result, because the vehicle 100 is stopped on the right-downward slope and the load W detected by the load sensors 50 and 60 is reduced in comparison to a flat place, the load W as the load for determination WD is less than each of the determination thresholds W4 and W5, and none of the conditions No. 1-1 and No. 1-2 for changing a determined state from "other than an adult" to "adult" is satisfied (Step S302).

As a result, the load object determination part 73 maintains the determined state indicating that the load object on the seat 80 is "other than an adult", and maintains the state of turning on the indicator lamp (A/B OFF lamp) in the vehicle interior indicating that the airbag is in an inflation not possible state (an operation prohibited state) (Step S303).

Next, the load object determination part 73 determines whether the condition No. 1-1 or the condition No. 1-2 for changing a determined state from "other than an adult" to "adult" is satisfied (Step S304). If the corrected load WC from the load correction part 72 is still not available, neither the condition No. 1-1 nor the condition No. 1-2 is satisfied (NO in Step S304). Therefore, the load object determination part 73 maintains the determined state "other than an adult" (Step S303).

Here, when the corrected load WC from the load correction part 72 becomes available, the corrected load WC corrected according to the right-download inclination of the vehicle 100 becomes at least greater than or equal to the determination threshold W1. However, when the difference between the determination threshold W1 and the determination threshold W4 is set to be greater for the purpose of avoiding an erroneous determination due to a change in the posture or so, there is a likelihood that even the corrected load WC does not become greater than or equal to the determination threshold W4 (in other words, there is a likelihood that the condition No. 1-1 cannot be satisfied). On the other hand, by using the determination threshold W5 (<"the determination threshold W4") that is set appropriately in consideration only of a case where the vehicle 100 is inclined in a right-download manner greater than or equal to a predetermined amount (a state where the lateral acceleration Gy indicates an absolute value greater than or equal to the predetermined acceleration "ath" in the rightward direction), the corrected load WC becomes greater than or equal to the determination threshold W5. Therefore, the condition No. 1-2 is satisfied (YES in Step S304), the load object determination part 73 then determines that the load object on the seat 80 is an "adult", and turns on the indicator lamp (A/B ON lamp) in the vehicle interior indicating the airbag inflation possible state (operation permitted state) (Step S305).

Thus, according to the load object determination apparatus 1 in the fourth embodiment, even if an erroneous determination is made that the load object on the seat 80 is "other than an adult" when the vehicle 100 is stopped on a right-downward slope or so immediately after IG-ON, it is possible to thereafter determine the load object on the seat 80 as an "adult" correctly. Also, according to the load object determination apparatus 1 in the fourth embodiment, the condition for determining that the load object on the seat 80 is an "adult" is that the load for determination WD is greater than or equal to the determination threshold W5, the lateral acceleration Gy indicates an absolute value greater than or equal to the predetermined acceleration "ath" in the rightward direction, and also, this state continues for the predetermined period of time or more. Therefore, it is possible to avoid an erroneous determination otherwise occurring when the conditions of the load for determination WD and the lateral acceleration Gy are temporarily satisfied due to a change in the position of the center of gravity of the seat (a change in the posture) of the load object on the seat 80 or so, and it is possible to further improve the determination accuracy.

Note that, a likelihood that "other than an adult" on the seat 80 is erroneously determined as an "adult" due to easing the determination threshold W4 into the determination threshold W5 and determining whether the load object on the seat 80 is an "adult" is very low, as will now be described. That is, in order that the load object determination part 73 erroneously determines that "other than an adult" on the seat 80 as an "adult", it is necessary that "other than an adult" on the seat 80 moves to the left side of the seat 80 in its center of gravity (the side of the supporting parts at which the load sensors 50 and 60 are installed) and thus the load W detected by the load sensors 50 and 60 is increased. However, when the vehicle 100 is inclined greater than or equal to the predetermined amount in the right-download manner (in a state where the lateral acceleration Gy indicates an absolute value greater than or equal to the predetermined acceleration "ath" in the rightward direction), it is difficult for the load object to move its center of gravity to the left side of the seat 80 unless such a movement is made intentionally. Therefore, the corresponding erroneous determination hardly occurs.

In summary, according to the load object determination apparatus 1 in the fourth embodiment, it is possible to avoid an erroneous determination of an occupant otherwise occurring due to a change in the posture or so (an erroneous determination of "other than an adult" as an "adult"), and also, it is possible to make a correct determination (as an "adult") thereafter even when first making an erroneous determination due to the vehicle 100 being stopped on a slope or so (an erroneous determination of an "adult" as "other than an adult").

Note that, according to the fourth embodiment, when the determination threshold W4 is eased into the determination threshold W5, the condition concerning the lateral acceleration Gy is added. However, it is also possible that, the same as the second or third embodiment, a period of time at which the condition is eased is limited (for example, 10 seconds after IG-ON, a predetermined number of times of travelling after IG-ON, or so).

Further, in the fourth embodiment, a determined state is determined between an "adult" and "other than an adult". However, it is also possible that, the same as the above-described variant, a determined state is determined from among an "adult", a "child seat" and "no occupant". In this case, it is possible that the condition No. 3 in the variant is replaced by two conditions the same as or similar to the conditions Nos. 1-1 and 1-2 in the fourth embodiment, and the conditions Nos. 4-1 and 4-2 in the variant are replaced by one condition the same as or similar to the condition 2 in the fourth embodiment. Thereby, it is possible to acquire advantageous effects the same as or similar to those of the fourth embodiment. That is, it is possible to avoid an erroneous determination otherwise occurring due to a change in the posture or so (an erroneous determination of a "child seat" as an "adult"), and also, it is possible to make a correct determination (as an "adult") thereafter even when first making an erroneous determination due to the vehicle 100 being stopped on a slope or so (an erroneous determination of an "adult" as a "child seat").

Thus, the load object determination apparatuses have been described in the embodiments and variants. However, the present invention is not limited to such specific embodiments or variants. Various modifications can be made without departing from the scope of the present invention.

For example, in the above-described embodiments and variants, the load sensors 50 and 60 detect loads exerted on the supporting parts at the left two places from among the supporting points at the four places of the seat 80. However, it is also possible that the load sensors 50 and 60 detect loads exerted on the supporting parts at the right two places. In this case, "left-downward" can be replaced by "right-downward" and "right-downward" can be replaced by "left-downward" in the load correction and the load object determination in each of the embodiments and variants. Also, "leftward direction" can be replaced by "rightward direction" and "rightward direction" can be replaced by "leftward direction" in the lateral acceleration Gy in each of the embodiments and variants. Thus, it is possible to acquire advantageous effects the same as or similar to the embodiments and variants.

It is also possible that the load sensors 50 and 60 detect loads exerted on the supporting parts at the front two places from among the supporting parts at the four places of the seat 80. In this case, "left-downward" can be replaced by "front-downward", "right-downward" can be replaced by "rear-downward", and the "lateral acceleration Gy" can be replaced by the "acceleration Gx" in the load correction and the load object determination in each of the embodiments and variants. Also, "leftward direction" can be replaced by "frontward direction" and "rightward direction" can be replaced by "rearward direction" in the acceleration Gx (the lateral acceleration Gy before the replacement). Thus, it is possible to acquire advantageous effects the same as or similar to the embodiments and variants. Similarly, it is also possible that the load sensors 50 and 60 detect loads exerted on the supporting parts at the rear two places from among the supporting parts at the four places of the seat 80. In this case, "left-downward" can be replaced by "rear-downward", "right-downward" can be replaced by "front-downward", and the "lateral acceleration Gy" can be replaced by the "acceleration Gx" in the load correction and the load object determination in each of the embodiments and variants. Also, "leftward direction" can be replaced by "rearward direction" and "rightward direction" can be replaced by "frontward direction" in the acceleration Gx (the lateral acceleration Gy before the replacement). Thus, it is possible to acquire advantageous effects the same as or similar to the embodiments and variants.

Further, in the embodiments and variants, the lateral acceleration Gy or the acceleration Gx detected by the G sensor 40 is used as a physical quantity corresponding to an inclination in the leftward/rightward direction or the frontward/rearward direction of the vehicle 100. However, it is also possible to use, for example, an inclination in the leftward/rightward direction or the frontward/rearward direction detected by an inclination sensor instead. However, in the vehicle 100, normally, the G sensor 40 is installed in many cases regardless of the load object determination apparatus 1. Therefore, it is preferable to use the G sensor 40 from a viewpoint of providing the load object determination apparatus 1 at low cost.

According to the embodiments and variants, when detecting a load exerted on some of a plurality of supporting parts of a seat and determining the type of a load object on the seat based on the load, it is possible to provide a load object determination apparatus whereby it is possible to avoid an erroneous determination otherwise occurring due to a change in the posture of an occupant or so seated on the seat, and also, it is possible to make a correct determination thereafter even when first making an erroneous determination due to a vehicle being stopped on a slope or so.

The present application is based on and claims the benefit of priority of Japanese Priority Application No. 2014-206706, filed on Oct. 7, 2014, the entire contents of which are hereby incorporated herein by reference.

What is claimed is:

1. A load object determination apparatus comprising:
a load detection part installed at a supporting part at one of left and right sides among a plurality of supporting parts that support a seat of a vehicle, the load detection part detecting a load exerted on the supporting part;
a leftward and rightward inclination detection part that detects a physical quantity corresponding to a leftward or rightward inclination of the vehicle;
a load correction part that corrects the load detected by the load detection part according to the leftward or rightward inclination of the vehicle based on the physical quantity and outputs a corrected load, the load correction part not outputting the corrected load when the load correction part determines that a detection value of the leftward and rightward inclination detection part is not precise or the load correction part cannot start a process of correcting the load detected by the load detection part; and
a determination part that at least determines whether a load object on the seat is an adult or an object other than an adult a plurality of times at a predetermined timing during a period of time from an ignition of the vehicle being turned on to the ignition of the vehicle being turned off, the determination part using the corrected load as a load for determination when the load correction part outputs the corrected load and the determination part using the load detected by the load detection part as the load for determination when the load correction part does not output the corrected load, and the determination part determining that the load object on the seat is the adult when at least the load for determination is greater than or equal to a first threshold and the determination part determining that the load object on the seat is the object other than the adult when at least the load for determination is less than a second threshold that is set to be less than the first threshold, wherein
the determination part determines that the load object on the seat is the object other than the adult when at least the load for determination is less than a third threshold that is set to be less than or equal to the first threshold and greater than the second threshold and the physical quantity detected by the leftward and rightward inclination detection part indicates that the vehicle is inclined greater than or equal to a predetermined amount in such a manner that the one of left and right sides is lower than the other.

2. A load object determination apparatus comprising:
a load detection part installed at a supporting part at one of front and rear sides among a plurality of supporting parts that support a seat of a vehicle, the load detection part detecting a load exerted on the supporting part;
a frontward and rearward inclination detection part that detects a physical quantity corresponding to a frontward or rearward inclination of the vehicle;
a load correction part that corrects the load detected by the load detection part according to the frontward or rearward inclination of the vehicle based on the physical quantity and outputs a corrected load, the load correction part not outputting the corrected load when the load correction part determines that a detection value of the frontward and rearward inclination detection part is not precise or the load correction part cannot start a process of correcting the load detected by the load detection part; and
a determination part that at least determines whether a load object on the seat is an adult or an object other than an adult a plurality of times at a predetermined timing during a period of time from an ignition of the vehicle being turned on to the ignition of the vehicle being turned off, the determination part using the corrected load as a load for determination when the load correction part outputs the corrected load and the determination part using the load detected by the load detection part as the load for determination when the load correction part does not output the corrected load, and the determination part determining that the load object on the seat is the adult when at least the load for determination is greater than or equal to a first threshold and the determination part determining that the load object on the seat is the object other than the adult when at least the load for determination is less than a second threshold that is set to be less than the first threshold, wherein
the determination part determines that the load object on the seat is the object other than the adult when at least the load for determination is less than a third threshold that is set to be less than or equal to the first threshold and greater than the second threshold and the physical quantity detected by the frontward and rearward inclination detection part indicates that the vehicle is inclined greater than or equal to a predetermined amount in such a manner that the one of front and rear sides is lower than the other.

3. A load object determination apparatus comprising:
a load detection part installed at a supporting part at one of left and right sides among a plurality of supporting parts that support a seat of a vehicle, the load detection part detecting a load exerted on the supporting part;
a leftward and rightward inclination detection part that detects a physical quantity corresponding to a leftward or rightward inclination of the vehicle;
a load correction part that corrects the load detected by the load detection part according to the leftward or rightward inclination of the vehicle based on the physical quantity and outputs a corrected load, the load correction part not outputting the corrected load when the load correction part determines that a detection value of the leftward and rightward inclination detection part is not precise or the load correction part cannot start a process of correcting the load detected by the load detection part; and
a determination part that at least determines whether a load object on the seat is an adult or an object that is other than an adult a plurality of times at a predetermined timing during a period of time from an ignition of the vehicle being turned on to the ignition of the vehicle being turned off, the determination part using the corrected load as a load for determination when the load correction part outputs the corrected load and the determination part using the load detected by the load detection part as the load for determination when the load correction part does not output the corrected load, and the determination part determining that the load object on the seat is the object other than the adult when at least the load for determination is less than a first threshold and the determination part determining that the load object on the seat is the adult when at least the load for determination is greater than or equal to a second threshold that is set to be greater than the first threshold, wherein the determination part determines that the load object on the seat is the adult when at least the load for determination is greater than or equal to a third threshold that is set to be greater than or equal to the first threshold and less than the second threshold and the physical quantity detected by the leftward and rightward inclination detection part indicates that the vehicle is inclined greater than or equal to a predetermined amount in such a manner that a side opposite to the one of left and right sides is lower than the other.

4. A load object determination apparatus comprising:

a load detection part installed at a supporting part at one of front and rear sides among a plurality of supporting parts that support a seat of a vehicle; the load detection part detecting a load exerted on the supporting part;

a frontward and rearward inclination detection part that detects a physical quantity corresponding to a frontward or rearward inclination of the vehicle;

a load correction part that corrects the load detected by the load detection part according to the frontward or rearward inclination of the vehicle based on the physical quantity and outputs a corrected load, the load correction part not outputting the corrected load when the load correction part determines that a detection value of the frontward and rearward inclination detection part is not precise or the load correction part cannot start a process of correcting the load detected by the load detection part; and a determination part that at least determines whether a load object on the seat is an adult or an object other than an adult a plurality of times at a predetermined timing during a period of time from an ignition of the vehicle being turned on to the ignition of the vehicle being turned off, the determination part using the corrected load as a load for determination when the load correction part outputs the corrected load and the determination part using the load detected by the load detection part as the load for determination when the load correction part does not output the corrected load, and the determination part determining that the load object on the seat is the object other than the adult when at least the load for determination is less than a first threshold and the determination part determining that the load object on the seat is the adult when at least the load for determination is greater than or equal to a second threshold that is set to be greater than the first threshold, wherein the determination part determines that the load object on the seat is the adult when at least the load for determination is greater than or equal to a third threshold that is set to be greater than or equal to the first threshold and less than the second threshold and the physical quantity detected by the frontward and rearward inclination detection part indicates that the vehicle is inclined greater than or equal to a predetermined amount in such a manner that a side opposite to the one of front and rear sides is lower than the other.

5. The load object determination apparatus as claimed in claim 1, wherein the leftward and rightward inclination detection part detects an acceleration of the vehicle in a lateral direction, and the determination part determines that the load object on the seat is the object other than the adult when at least the load for determination is less than the third threshold and the acceleration has an absolute value greater than or equal to a predetermined amount in a direction of the one of left and right sides.

6. The load object determination apparatus as claimed in claim 2, wherein the frontward and rearward inclination detection part detects an acceleration of the vehicle in a frontward or rearward direction, and the determination part determines that the load object on the seat is the object other than the adult when at least the load for determination is less than the third threshold and the acceleration has an absolute value greater than or equal to a predetermined amount in a direction of the one of front and rear sides.

7. The load object determination apparatus as claimed in claim 5, wherein the determination part determines that the load object on the seat is the object other than the adult when at least the load for determination being less than the third threshold and the absolute value of the acceleration being greater than or equal to the predetermined amount in the direction of the one of left and right sides have continued for a predetermined period of time.

8. The load object determination apparatus as claimed in claim 6, wherein the determination part determines that the load object on the seat is the object other than the adult when at least the load for determination being less than the third threshold and the absolute value of the acceleration being greater than or equal to the predetermined amount in the direction of the one of front and rear sides have continued for a predetermined period of time.

9. The load object determination apparatus as claimed in claim 7, wherein the object other than the adult is a fastened child seat.

10. The load object determination apparatus as claimed in claim 9, further comprising;

a seat belt fastening detection part that detects whether a seat belt corresponding to the seat has been fastened, wherein the determination part determines whether the load object on the seat is the adult or the fastened child seat and the determination part determines that the load object on the seat is the fastened child seat when the load for determination being less than the third threshold, the absolute value of the acceleration being greater than or equal to the predetermined amount in the direction of the one of left and right sides, and fastening of the seat belt having been detected by the seat belt fastening detection part have continued for the predetermined period of time.

11. The load object determination apparatus as claimed in claim 8, wherein the object other than the adult is a fastened child seat.

12. The load object determination apparatus as claimed in claim 11, further comprising:

a seat belt fastening detection part that detects whether a seat belt corresponding to the seat has been fastened, wherein the determination part determines whether the load object on the seat is the adult or the fastened child seat and the determination part determines that the load object on the seat is the fastened child seat when the load for determination being less than the third threshold, the absolute value of the acceleration being greater than or equal to the predetermined amount in the direction of the one of front and rear sides, and fastening of the seat belt having been detected by the seat belt fastening detection part have continued for the predetermined period of time.

13. The load object determination apparatus as claimed in claim 1, wherein the load detection part is a load sensor, and the leftward and rightward inclination detection part is an acceleration sensor, and
wherein the load correction part and the determination part are an electronic control unit.

14. The load object determination apparatus as claimed in claim 2, wherein the load detection part is a load sensor, and the frontward and rearward inclination detection part is an acceleration sensor, and
wherein the load correction part and the determination part are an electronic control unit.

15. The load object determination apparatus as claimed in claim 3, wherein the load detection part is a load sensor, and the leftward and rightward inclination detection part is an acceleration sensor, and
wherein the load correction part and the determination part are an electronic control unit.

16. The load object determination apparatus as claimed in claim 4, wherein the load detection part is a load sensor, and the frontward and rearward inclination detection part is an acceleration sensor, and
wherein the load correction part and the determination part are an electronic control unit.

17. The load object determination apparatus as claimed in claim 3, wherein the object other than the adult is a fastened child seat.

18. The load object determination apparatus as claimed in claim 4, wherein the object other than the adult is a fastened child seat.

* * * * *